United States Patent
Bergljung et al.

(10) Patent No.: US 12,363,647 B2
(45) Date of Patent: Jul. 15, 2025

(54) VARIABLE DUTY CYCLE FOR POWER CONTROL

(71) Applicant: TELEFONAKTIEBOLAGET LM ERICSSON (PUBL), Stockholm (SE)

(72) Inventors: Christian Bergljung, Lund (SE); Daniel Chen Larsson, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 71 days.

(21) Appl. No.: 17/766,474

(22) PCT Filed: Oct. 3, 2020

(86) PCT No.: PCT/IB2020/059299
§ 371 (c)(1),
(2) Date: Apr. 4, 2022

(87) PCT Pub. No.: WO2021/064698
PCT Pub. Date: Apr. 8, 2021

(65) Prior Publication Data
US 2024/0089872 A1    Mar. 14, 2024

Related U.S. Application Data

(60) Provisional application No. 62/911,091, filed on Oct. 4, 2019.

(51) Int. Cl.
*H04W 52/36* (2009.01)
*H04W 52/14* (2009.01)

(52) U.S. Cl.
CPC ......... *H04W 52/36* (2013.01); *H04W 52/146* (2013.01)

(58) Field of Classification Search
CPC ... H04W 52/36; H04W 52/146; H04W 76/28; H04W 52/246; H04W 72/044; H04W 52/34; H04W 52/38
See application file for complete search history.

(56) References Cited

U.S. PATENT DOCUMENTS

2019/0281598 A1   9/2019  Almalfouh et al.
2020/0021421 A1*  1/2020  Han ................... H04W 74/002

FOREIGN PATENT DOCUMENTS

WO   WO-2018125686 A2 *  7/2018  ........... G01S 17/931
WO       2020013954 A1     1/2020

OTHER PUBLICATIONS

3GPP, "3rd Generation Partnership Project; Technical Specification Group Radio Access Network; Evolved Universal Terrestrial Radio Access (E-UTRA); Physical channels and modulation (Release 15)", TS 36.211 V15.7.0. pp. 9-95, Sep. 2019.
(Continued)

*Primary Examiner* — Ankur Jain
(74) *Attorney, Agent, or Firm* — Sage Patent Group

(57) ABSTRACT

A method of operating a user equipment, UE, that is served by a radio access network, RAN, includes determining an uplink duty cycle for uplink transmission by the UE to the RAN, and selecting a peak uplink power level in response to the determined uplink duty cycle. A method of operating a UE according to some embodiments that communicates with a RAN via a plurality of component carriers includes determining an aggregate uplink duty cycle based on scheduled uplink time intervals across the plurality of component carriers, and selecting a peak uplink transmission power level for transmitting uplink signals on the plurality of component carriers in response to the determined aggregate uplink duty cycle. Related devices are also disclosed.

22 Claims, 11 Drawing Sheets

(56) References Cited

OTHER PUBLICATIONS

3GPP, "3rd Generation Partnership Project; Technical Specification Group Radio Access Network; NR; Physical layer procedures for control (Release 15)", TS 38.213 V15.7.0, Sep. 2019.
3GPP, "3rd Generation Partnership Project; Technical Specification Group Radio Access Network; NR; Physical channels and modulation (Release 15)", TS 38.211 V15.7.0, Sep. 2019.
3GPP, "3rd Generation Partnership Project; Technical Specification Group Radio Access Network; NR; Radio Resource Control (RRC) protocol specification (Release 15)", TS 38.331 V15.7.0, Sep. 2019.
CHTTL, "Further discussion on solutions for EN-DC FDD-TDD High Power UE", TSG-RAN Working Group 4 (Radio) meeting #91, R4-1906469, Reno, USA, May 13-17, 2019.
Ericsson, "Configured output power for EN-DC", TSG-RAN Working Group 4 (Radio) meeting #87, R4-1806725, Busan, South Korea, May 21-25, 2018.
NTT Docomo et al., "Effective use of the remaining power of High Power UE", 3GPP TSG RAN WG4 Meeting #92, R4-1909061, Ljubljana, SI, Aug. 26-30, 2019.

* cited by examiner

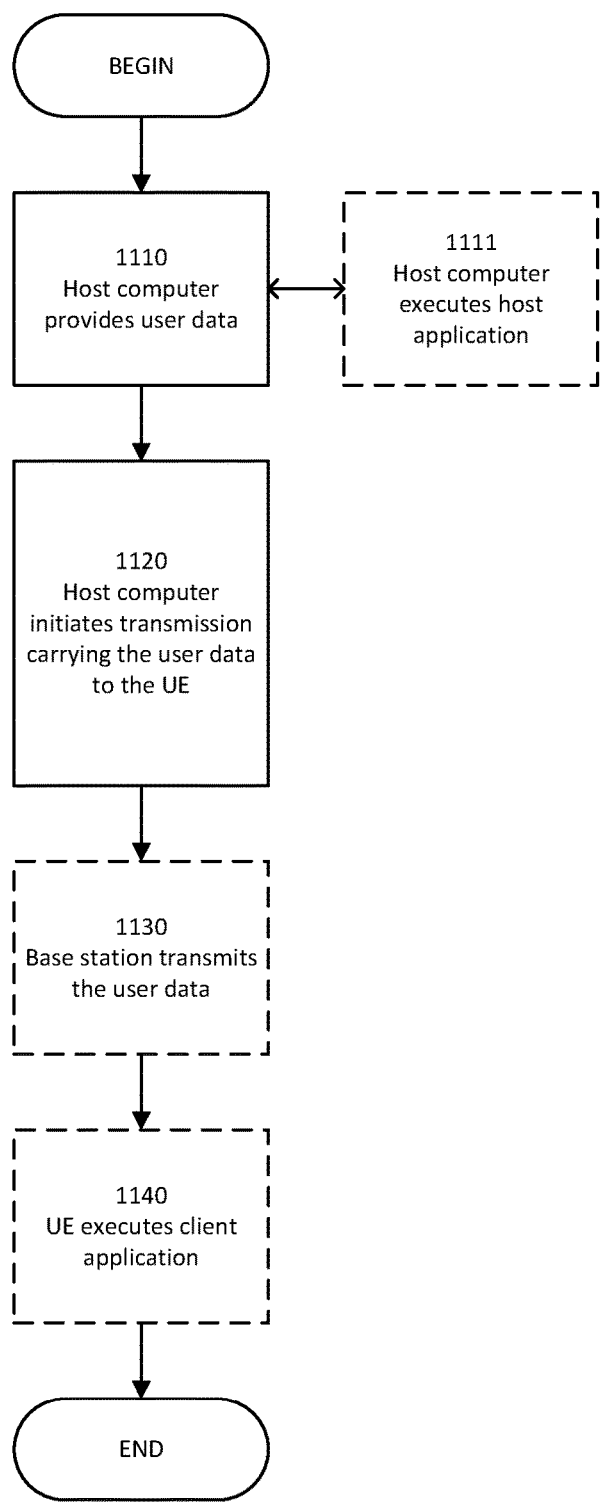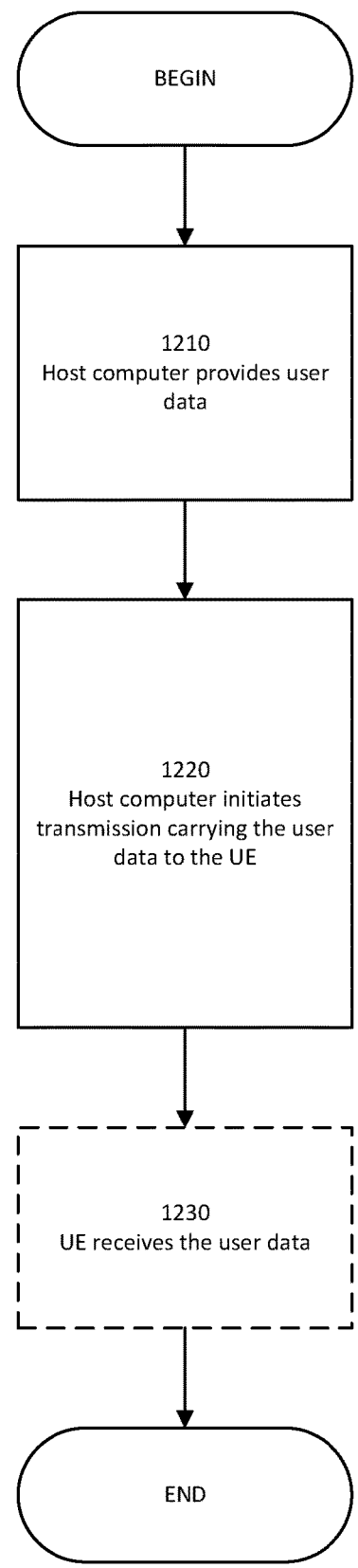
FIGURE 11
FIGURE 12

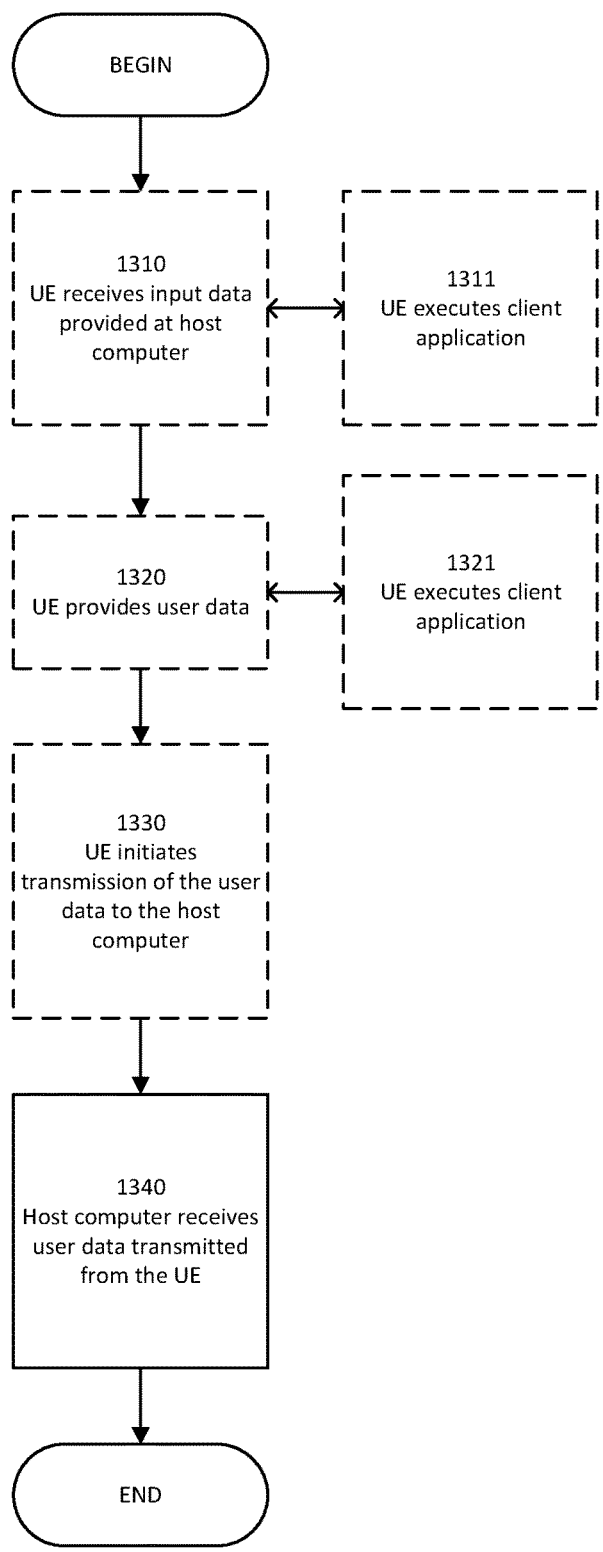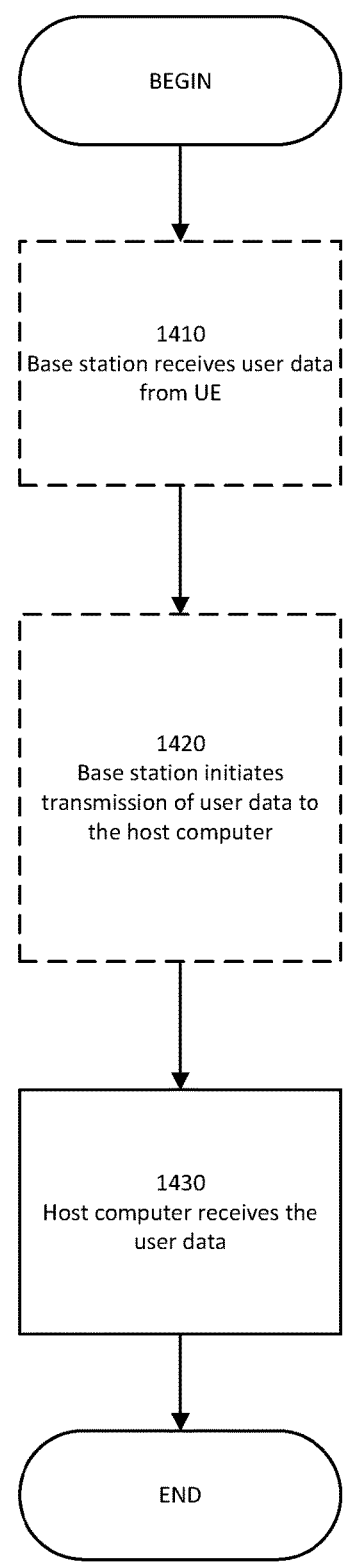
FIGURE 13
FIGURE 14

VARIABLE DUTY CYCLE FOR POWER CONTROL

RELATED APPLICATIONS

This application is a national stage application of International Patent Application No. PCT/IB2020/059299, filed Oct. 3, 2020, which claims the benefit of U.S. Provisional Pat. App. No. 62/911,091 filed Oct. 4, 2019, the disclosures of which are incorporated herein by reference in their entirety.

TECHNICAL FIELD

The present application relates to communication networks, and in particular to power control in wireless communication networks.

BACKGROUND

As 5G networks are deployed, there is interest in integrating 5G nodes in systems that support previous standards, such as Long Term Evolution (LTE, also referred to as E-UTRA or EUTRA). When a 5G radio access network (RAN) node is connected to an LTE core network (the Evolved Packet Core, or EPC), or vice-versa (i.e., an LTE RAN node is connected to a 5G core network (5GC)), the integration is referred to as "interworking." There are different ways to deploy 5G networks with or without interworking with LTE and evolved packet core (EPC), as depicted in FIG. 1. In principle, NR and LTE can be deployed without any interworking, denoted by NR standalone (SA) operation. That is, a RAN node, such as a gNB, in NR can be connected to a 5G core network (5GC) and an LTE RAN node, such as an eNB, can be connected to EPC with no interconnection between the two (Option 1 and Option 2 in FIG. 1).

On the other hand, the first supported version of NR is the so-called EN-DC (E-UTRAN-NR Dual Connectivity), illustrated by Option 3 in FIG. 1. In such a deployment, dual connectivity between NR and LTE is implemented with the LTE RAN node acting as the master node (MN) and the NR RAN node acting as the secondary node (SN). Accordingly, in EN-DC, the UE is connected to an E-UTRA eNB as master node and a gNB as secondary node. Both the MeNB and the en-gNB are connected to an EPC core network. The RAN node (gNB) supporting NR may not have a control plane connection to the EPC core network, and instead relies on the LTE RAN node as the master node (MeNB). This is also called "Non-standalone NR". Note that in this case, the functionality of an NR cell is limited and would be used for connected mode UEs as a booster and/or diversity leg, but an UE in RRC_IDLE state cannot camp on the NR cell in this scenario.

With the introduction of 5GC, other options may be also valid. As mentioned above, Option 2 shown in FIG. 1 supports a stand-alone NR deployment where the gNB is connected to the 5GC core. Similarly, an LTE RAN node can also be connected to the 5GC core using Option 5. This scenario is referred to as eLTE, E-UTRA/5GC, or LTE/5GC. In these cases, both the NR RAN node and the LTE RAN node are seen as part of the NG-RAN.

Option 4 and Option 7 are other variants for providing dual connectivity between LTE and NR which will be standardized as part of NG-RAN connected to 5GC, denoted by MR-DC (Multi-Radio Dual Connectivity). Scenarios in which an NR gNB is connected to EPC core (with and without interconnectivity to LTE) are also possible, although they seem to be less practical and hence will not be pursued further in 3GPP.

In Option 4, referred to as NE-DC, the MN will be an NR node while the SN will be an E-UTRA node connected to 5GC. As such, the RRC configurations will be delivered by the NR MN, including a transparent container containing LTE IEs for the SN.

In Option 7, referred to as NGEN-DC, the MN is an E-UTRA node connected to a 5GC core and the SN is an NR node. In this scenario, the RRC configurations will be provided in the same way as in EN-DC, i.e., the NR SN and SCG configurations will provided as IEs inside the LTE RRCConnectionReconfiguration message. The main difference compared to EN-DC will be that the MN and SN will be connected to 5GC instead of EPC.

Another option, not illustrated in FIG. 1, is NR-DC or NN-DC, in which both the MN and SN are NR nodes. In that case, all RRC configurations will be provided by NR RRC, i.e., as IEs inside the RRCReconfiguration message as defined in [2].

Citations are provided below for references that are mentioned in the present disclosure.

Reference [1]: 3GPP TS 36.211 v 15.7.0
Reference [2]: 3GPP TS 38.331 v 15.7.0
Reference [3]: 3GPP TS 38.213 v 15.7.0
Reference [4]: 3GPP TS 38.211 v 15.7.0

SUMMARY

Some embodiments provide a method of operating a user equipment, UE, that is served by a radio access network, RAN. The method includes determining an uplink duty cycle for uplink transmission by the UE to the RAN, and selecting a peak uplink power level in response to the determined uplink duty cycle.

According to some embodiments, the peak uplink transmit power used in a time interval can be adjusted by a UE taking into account the actual, effective, estimated or maximum uplink duty cycle of the UE during the time interval. Accordingly, it may be possible to increase the UE's output power without violating exposure limits or other limits, such as limits due to heat management in the UE.

In some embodiments, determining the uplink duty cycle includes determining the uplink duty cycle based on a common time division duplexing, TDD, uplink/downlink pattern provided by a network node in the RAN.

In some embodiments, the uplink duty cycle may be determined based on a dedicated uplink/downlink pattern provided by a network node in the RAN. In some embodiments, based on a slot format indicator, SFI, provided by a network node in the RAN.

In some embodiments, the uplink duty cycle represents a fraction of time in a time period during which the UE is scheduled to transmit uplink signals to the RAN. In some embodiments, the uplink duty cycle represents a fraction of time in a time period that is reserved for transmission of uplink signals to the RAN. In some embodiments, the uplink duty cycle represents a fraction of time in a time period that is reserved for transmission of uplink signals to the RAN or that is reserved for flexible time slots, where the time period may be a frame.

In some embodiments, the uplink duty cycle is determined on a timeslot by timeslot basis, while in other embodiments, the uplink duty cycle is determined on a symbol by symbol basis.

In some embodiments, the uplink duty cycle may be determined based on a number of slots or symbols reserved for downlink communications in a given time period.

In some embodiments, the UE may be connected to the RAN via carrier aggregation, and the uplink duty cycle may be determined across a plurality of component carriers.

In some embodiments, the uplink duty cycle may be determined based on a number of time intervals that are reserved for uplink transmission on any of the plurality of component carriers.

In some embodiments, the uplink duty cycle may be determined based on a number of time intervals that are reserved for uplink transmission or that are available for uplink or downlink communications on any of the plurality of component carriers.

In some embodiments, the UE is connected to a first cell group served by a new radio, NR, network node and to a second cell group served by a long term evolution, LTE, node via dual connectivity, and the duty cycle is determined based on an uplink/downlink configuration provided for the second cell group and based on a common time division duplexing, TDD, uplink/downlink pattern, dedicated uplink/downlink pattern and/or slot frame indicator, SFI, provided for the first cell group.

In some embodiments, the duty cycle is determined as N/P, where N is a number of time intervals in a given time period in which the UE is scheduled to transmit uplink communications and P is a total number of time intervals in the time period.

In some embodiments, the UE selects a peak uplink power for user during a time period such that an average uplink power during the time period is less than a predetermined power level. The predetermined power level may be 23 dBm in some embodiments.

In some embodiments, the duty cycle may be modified due to device heat management, due to Discontinuous Transmission, DTX, or Discontinuous Reception, DRX, due to measurement gaps, due to specific absorption rate (SAR) and proximity detection, for carrier aggregation due to UE capability to transmit and receive simultaneously, due to any type of maximum power reduction, MPR, that is associated with an operating band of the UE, and/or due to the UL transmissions on a frequency range FR2 of 24250 MHz to 52600 MHz or a duty cycle of FR2 transmissions.

The method of any precious Claim, wherein the duty cycle is adjusted based on transmission on another radio access technology, wherein the other radio access technology can be WiFi, CDMA2000 or another LTE or NR connection.

The RAN may be either a New Radio access network or an evolved universal terrestrial radio access network (E-UTRAN). Accordingly, the RAN node may be an eNodeB or a gNodeB.

Some embodiments provide a method of operating a user equipment, UE, that communicates with a radio access network, RAN via a plurality of component carriers. The method includes determining an aggregate uplink duty cycle based on scheduled uplink time intervals across the plurality of component carriers, and selecting a peak uplink transmission power level for transmitting uplink signals on the plurality of component carriers in response to the determined aggregate uplink duty cycle.

The method may further include transmitting uplink communications using the selected peak uplink transmission power level.

A user equipment, UE, node, according to some embodiments is configured to perform operations including determining an uplink duty cycle for uplink transmission by the UE to the RAN, and selecting a peak uplink power level in response to the determined uplink duty cycle.

A user equipment, UE, node, according to some embodiments is configured to perform operations including determining an aggregate uplink duty cycle based on scheduled uplink time intervals across the plurality of component carriers, and selecting a peak uplink transmission power level for transmitting uplink signals on the plurality of component carriers in response to the determined aggregate uplink duty cycle.

A user equipment, UE, node according to some embodiments includes a processor, a wireless transceiver coupled to the processor, and a memory coupled to the processor. The memory includes computer readable instructions that, when executed by the processor, cause the UE to perform operations including determining an uplink duty cycle for uplink transmission by the UE to the RAN, and selecting a peak uplink power level in response to the determined uplink duty cycle.

In some embodiments, the memory includes computer readable instructions that, when executed by the processor, cause the UE to perform operations including determining an aggregate uplink duty cycle based on scheduled uplink time intervals across the plurality of component carriers, and selecting a peak uplink transmission power level for transmitting uplink signals on the plurality of component carriers in response to the determined aggregate uplink duty cycle.

BRIEF DESCRIPTION OF THE DRAWINGS

FIG. 11 is a block diagram of methods implemented in a communication system including a host computer, a base station, and a user equipment in accordance with some embodiments.
FIG. 12 is a block diagram of methods implemented in a communication system including a host computer, a base station, and a user equipment in accordance with some embodiments.
FIG. 13 is a block diagram of methods implemented in a communication system including a host computer, a base station, and a user equipment in accordance with some embodiments.
FIG. 14 is a block diagram of methods implemented in a communication system including a host computer, a base station, and a user equipment in accordance with some embodiments.

DETAILED DESCRIPTION OF EMBODIMENTS

Figure 1:
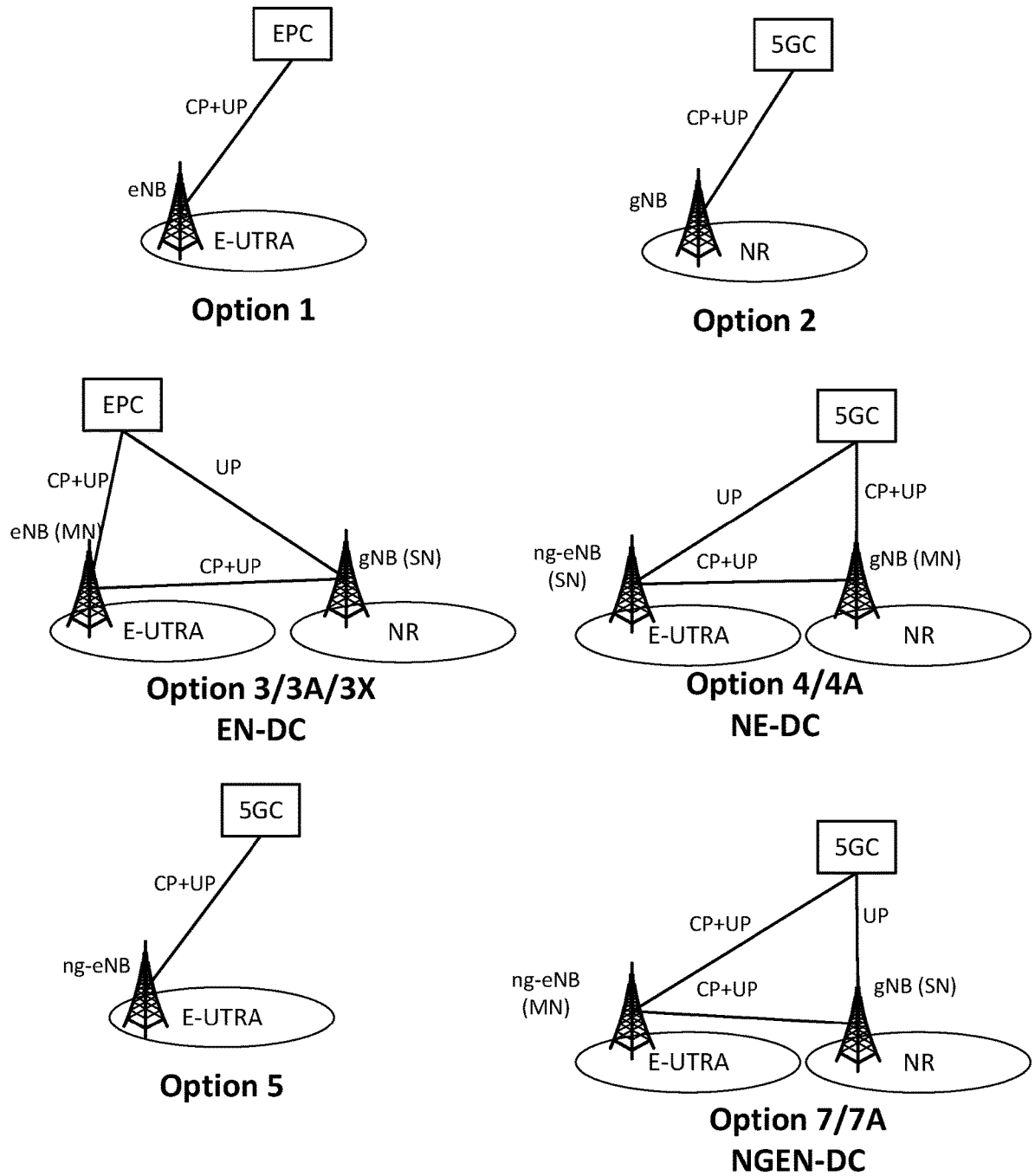
FIG. 1 illustrates various NR/LTE interworking options.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Determining or configuring the duty cycle of a UE for uplink transmissions (i.e., the uplink duty cycle, $u_D$) is important in cases where the uplink power level is such that the specific absorption rate (SAR) or other exposure limits may be violated. Measurements of exposure limits are usually long-term measurements compared to the length typical uplink transmission bursts, which makes it possible to control the power during transmission bursts to manage the long-term average uplink power such that the exposure limits are not exceeded. This requires determination of the uplink duty cycle.

For some cases, it may be possible, based on the uplink duty cycle, to increase the output power during an uplink transmission burst while still meeting requirements on the total (long-term) average output power. One such case is described below for LTE and NR dual connectivity, but the principle is general and may be applied in other scenarios.

In view of the SAR measurement procedures, the TDD power during bursts can be increased by borrowing power from the FDD UL, i.e. by reducing the FDD UL power, and assume a maximum duty cycle for the TDD UL allowed for SAR measurements.

For verification of the power class, the upper tolerance limit (+25 dBm for power class 3) is the maximum at which the unwanted emissions requirements are met and is relevant for SAR for PC3. Analogous with the SAR measurement, it is proposed that the upper limit of the EN-DC power class may be verified by averaging the power over at least one radio frame (10 ms). The average nominal power should not exceed 23 dBm for both PC3 (power class 3) and PC2 (power class 2).

The lower tolerance limit (+20 dBm for PC3) is the UE power capability at which unwanted emissions requirements and in-channel requirements must be met and should still be verified per subframe (1 ms). The same applies to the maximum power per burst per CG to make sure compliance with LTE and NR power classes.

First, $P_{LTE}$ is set as less than 23 dBm. Then the maximum NR power is set such that the total average power over a radio frame does not exceed 23 dBm, i.e.

$$P_{PowerClass,EN-DC} - \Delta P_{PowerClass},$$

where $\Delta P_{PowerClass}=3$ dB for PC2 and $\Delta P_{PowerClass}=0$ dB for PC3. Assuming a maximum duty cycle $u_D$, then the NR maximum power during bursts must not exceed, with lower-case notions are in linear scale, $$P_{max,NR} 10 \log_{10} \text{MIN}\{p_{PowerClass,NR}, (p_{PowerClass,EN-DC}/\Delta p_{PowerClass} - p_{LTE})/u_D\},$$

while making sure that the maximum power does not exceed the power class of the NR CG. This means that the total average power would be less than:

$$10 \log_{10}\{p_{LTE} + u_D(p_{PowerClass,En-DC}/\Delta P_{PowerClass}, P_{LTE})/Du_D\} = P_{PowerClass,EN-DC} - \Delta P_{PowerClass}$$

assuming a TDD duty cycle $u_D$ in the measurement (RMC) and that the power on the NR CG is not constrained by the power class.

The above implies that the configured total EN-DC power during TDD bursts could be set up to:

$$P_{Total}^{EN-DC} \leq \text{MIN}\{10 \log_{10}[p_{LTE} + \text{MIN}\{p_{PowerClass,NR}, (p_{PowerClass,EN-DC}/\Delta p_{PowerClass} - p_{LTE})/u_D\}], P_{EMAX,EN-DC}\}$$

In case the TDD duty cycle is less than $u_D$ the average total power is reduced (over at least a radio frame), but the average NR power should not exceed:

$$P_{avg,NR} \leq 10 \log_{10} \text{MIN}\{p_{PowerClass,NR}, (p_{PowerClass,EN-DC}/\Delta p_{PowerClass} - p_{LTE}), p_{EMAX,EN-DC}\}$$

Figure 2:
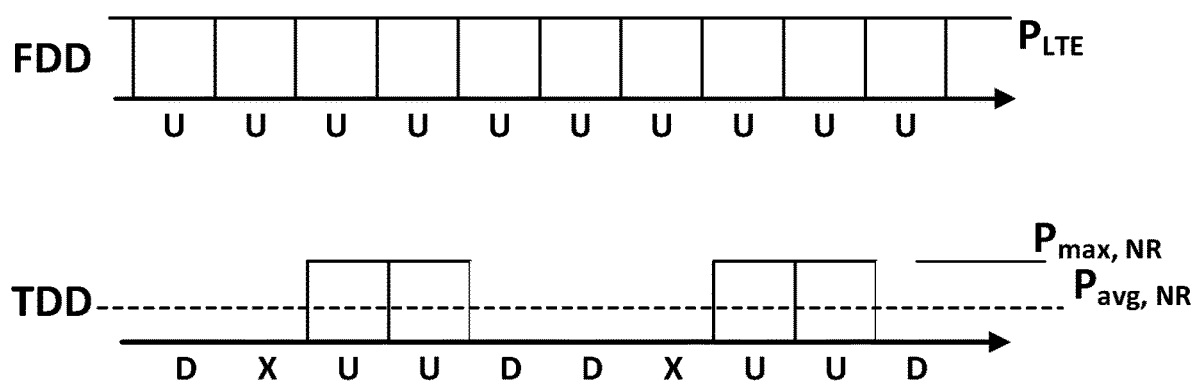
FIG. 2 illustrates adjustment of maximum transmit power.

In case the TDD duty cycle exceeds $u_D$ the maximum NR maximum power during the bursts should be reduced down to:

$$(p_{PowerClass,EN-DC}/\Delta p_{PowerClass} - p_{LTE})$$

attained at 100% TDD duty cycle. This means that the average total power is still $P_{PowerClass}$, EN-DC$-\Delta P_{PowerClass}$ and the configured EN-DC power be set to:

$$P_{Total}^{EN-DC} \geq \text{MIN}\{P_{PowerClass,EN-DC} - \Delta P_{PowerClass}, P_{EMAX,EN-DC}\}$$

which is the existing requirement. The procedure is illustrated in FIG. 2.

The above means that the total configured EN-DC power FDD-TDD band combination can be set as follows:

$$P_{EN-DC,tot\_L} \leq P_{Total}^{EN-DC} \leq P_{EN-DC,tot\_H}$$

where $$P_{EN-DC,tot\_L}(p,q) = \text{MIN}\{P_{PowerClass,EN-DC} - \Delta P_{PowerClass}, P_{EMAX,EN-DC}\}$$

$$P_{EN-DC,tot\_H}(p,q) = \text{MIN}\{10 \log_{10}[p_{LTE} + \text{MIN}\{p_{PowerClass,NR}, (p_{PowerClass,EN-DC}/\Delta p_{PowerClass} - p_{LTE})/u_D\}], P_{EMAX,EN-DC}\}$$

The lower limit serves two purposes: First, the UE may reduce the NR power if the actual duty cycle exceeds the uplink duty cycle $u_D$. Second, the existing requirements are not tightened (the UE can still use the lower limit).

However, the uplink power during the transmission burst depends on the duty cycle $u_D$, but the rules for setting this is not specified. Similar examples can be constructed for other scenarios, also for a single uplink carrier.

The uplink duty cycle depends on the slot configuration. Slot configuration is discussed in Sec. 11 of [3]. As discussed therein, a slot format includes downlink symbols, uplink symbols, and flexible symbols. If a UE is provided with a value for the field tdd-UL-DL-ConfigurationCommon, the UE sets the slot format per slot over a number of slots as indicated by tdd-UL-DL-ConfigurationCommon.

The information elements for this configuration are described in Sec. 6.3.2. of [2].

Figure 3:
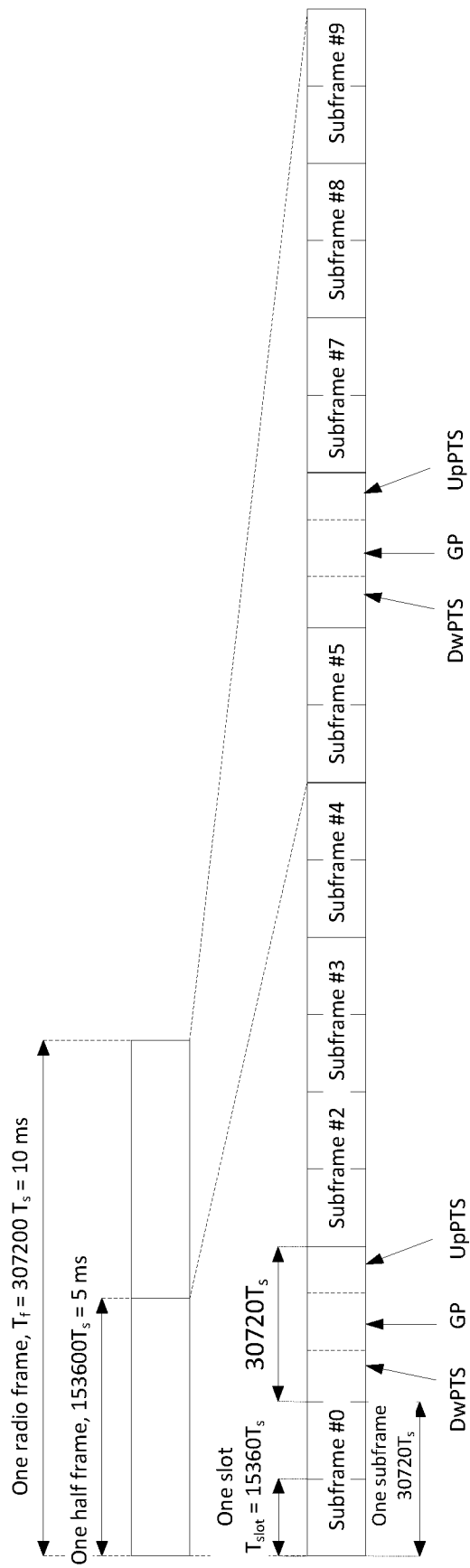
FIG. 3 illustrates a Frame Structure Type 2 for NR.

The TDD frame structure is described in Sec. 4.2 of W. As noted therein, the supported uplink-downlink configurations are listed in Table 4.2-2 of [1], reproduced as Table 1 below, where, for each subframe in a radio frame, "D" denotes a downlink subframe reserved for downlink transmissions, "U" denotes an uplink subframe reserved for uplink transmissions and "S" denotes a special subframe with the three fields DwPTS, GP and UpPTS. Frame Structure Type 2 is illustrated in FIG. 3.

TABLE 1

Uplink-downlink configurations

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the ongoing discussion in RAN4 it is under consideration for the network to indicate to the UE a fixed preconfigured uplink duty factor by a new parameter. The uplink duty factor will be used to indicate how many of the total number of slots will be used for UL when defining the maximum output power on the SCG in an NSA deployment. This will be provided as a fixed number to the UE that does not take into consideration the actual UL resources being used for UL by the UE, and also requires signaling of an additional parameter to the UE.

Furthermore, the proposed approach does not consider the duty cycle on the LTE side if, for example, the LTE side is operating in TDD spectrum only, nor does it consider a pure standalone NR deployment between different spectrums. Some embodiments described herein provide a general method for the UE to derive an actual, estimated, effective or maximum uplink duty cycle for use in setting the uplink power level. Some embodiments describe how the UE can determine or estimate the uplink duty for either standalone NR or when operating in EN-DC, and in addition how to derive the uplink duty cycle for LTE.

According to some embodiments, the peak uplink transmit power used in a time interval can be adjusted by a UE taking into account the actual, effective, estimated or maximum uplink duty cycle of the UE during the time interval. Accordingly, it may be possible to increase the UE's output power without violating exposure limits or other limits, such as limits due to heat management in the UE.

According to some embodiments, a UE may use an uplink duty cycle u D for purposes of calculating peak uplink transmission power that is either equal to or less than a value that is determined as described below. A smaller value of $u_D$ could be applied, for example, for power management or providing a larger SAR margin.

In the case of NR only (i.e., with no UL carrier aggregation (CA) on the NR side), the duty cycle on the NR can be determined based on the uplink and flexible slots/symbols given by the common TDD U/D patterns configured by RRC (static) in a given time interval, the dedicated U/D patterns configured for the UE in the time interval, and/or the SFI (Slot Format Indicator) signaled by the network for the time interval. In some embodiments, the time interval may correspond to a radio frame (e.g., 10 ms) or a sub-frame (1 ms). Alternatively, the downlink symbols/slots may be used for determining the duty cycle. That is, the duty cycle may be determined based on the number of downlink symbols/slots configured for the time interval in question.

For an LTE cell group, the uplink duty cycle u D may be determined based on the U/D configuration and the special subframe configuration.

For a configuration that uses UL CA on the NR side, the duty cycle may be determined as described above (e.g., based on the uplink and flexible slots/symbols given by the common TDD U/D patterns configured by RRC (static), the dedicated U/D patterns configured for the UE, and/or the SFI) but considering the uplink and flexible symbols that are common across the component carriers (or, alternatively the common DL symbols).

For LTE+NR with and without CA on NR and LTE side, the uplink duty cycle may be determined as follows. For the LTE cell group, the duty cycle may be determined based on the U/D configuration and the special subframe configuration. For the NR cell group, the duty cycle may be determined as described above, i.e., (e.g., based on the uplink and flexible slots/symbols given by the common TDD U/D patterns configured by RRC (static), the dedicated U/D patterns configured for the UE, and/or the SFI, but considering the uplink and flexible symbols that are common across the component carriers.

For NR operation with CA, the uplink duty cycle may be determined as described above, i.e., (e.g., based on the uplink and flexible slots/symbols given by the common TDD U/D patterns configured by RRC (static), the dedicated U/D patterns configured for the UE, and/or the SFI, but considering the uplink and flexible symbols that are common across the component carriers.

For NE-DC the duty cycle can be determined as in described above for LTE+NR with and without CA on NR and LTE side. For NN-DC the duty cycle can be determined as above for NR only with or without CA. The duty cycle for the MN and SN may be determined independently at least if power sharing is common between cell groups (which may depend on the band combination and UE RF front-end).

For NR the duty cycle in terms of how many UL resource to be used for power control can be derived at different level of granularity. In NR an OFDM symbol can be assigned to be for DL, UL or flexible as mentioned in the background part.

One can calculate this on the highest level on a slot level, then considering both resources assigned to UL and flexible as UL resources to consider for NR duty cycle. To get further granularity it is possible to calculate the this on OFDM symbol level wherein the resources considered in the NR duty cycle are OFDM symbols assigned to be either UL or flexible.

This is first illustrated for a single NR UL carrier, but the concept may be expanded for more UL carriers. In a first example the UE is not assigned any flexible resource, i.e. all the resources are either DL or UL. The UE is assigned this purely based on RRC signaled field tdd-UL-DL-ConfigurationCommon that is provided in the IE ServingCellConfigCommon or the IE ServingCellConfigCommonSIB.

At the slot level, the UE will count the number of slots within the pattern that contain at least one OFDM symbol being either UL or flexible. The duty cycle can be determined then in different ways, for example:

Duty cycle=Number of UL slots/Periodicity of pattern

In more detail the UE would do the following. If the UE is configured with the field pattern1 only in Tdd-UL-DL-ConfigurationCommon, it would do the following to calculate the duty cycle.

$N_{ul\_slot\_pattern1}$=the value of the field nrofUplinkSlots in the IE TDD-UL-DL-Pattern that is the type for pattern1.

$N_{ul\_symbols\_pattern1}$=the value of the field nrofUplinkSymbols in the IE TDD-UL-DL-Pattern that is the type for pattern1.

$P_{pattern1}$=the ratio between the value of the field dl-UL-TransmissionPeriodicity (given in ms) in the IE TDD-UL-DL-Pattern that is the type for pattern1 and 1 ms.

$\mu$=the translation of field referenceSubcarrierSpacing in the IE TDD-UL-DL-ConfigCommon as by table 4.2-1 in [4].

$N_{symb}^{slot}$=Number of symbols per slot, e.g. as defined in Table 4.3.2-1 or Table 4.3.2-2 in [4] for a given $\mu$.

For a slot level-based duty cycle:

$$n_{duty\,cycle} = \frac{N_{ul\_slot\_pattern1} + \left\lceil \frac{N_{ul\_symbols\_pattern1}}{N_{symb}^{slot}} \right\rceil}{P_{pattern1} \cdot 2^\mu}$$

Alternatively (for a symbol level based duty cycle):

$$n_{duty\,cycle} = \frac{N_{symb}^{slot} N_{ul\_slot\_pattern1} + N_{ul\_symbols\_pattern1}}{N_{symb}^{slot} P_{pattern1} \cdot 2^\mu}$$

If the UE is configured with the field pattern2 in addition to the field pattern1 in the IE Tdd-UL-DL-ConfigurationCommon. The duty cycle is calculated as follows:

$N_{ul\_slot\_pattern2}$=the value of the field nrofUplinkSlots in the IE TDD-UL-DL-Pattern that is the type for pattern2.

$N_{ul\_symbols\_pattern2}$=the value of the field nrofUplinkSymbols in the IE TDD-UL-DL-Pattern that is the type for pattern2.

$P_{pattern2}$=the ratio between the value of the field dl-UL-TransmissionPeriodicity in the IE TDD-UL-DL-Pattern that is the type for pattern2 (given in ms) and 1 ms.

Slot level based duty cycle:

$$n_{duty\,cycle} = \frac{N_{ul\_slot\_pattern1} + N_{ul\_slot\_pattern2} + \left\lceil \frac{N_{ul\_symbols\_pattern1}}{N_{symb}^{slot}} \right\rceil + \left\lceil \frac{N_{ul\_symbols\_pattern2}}{N_{symb}^{slot}} \right\rceil}{(P_{pattern1} + P_{pattern2}) \cdot 2^\mu}$$

Alternatively (slot level):

$$n_{duty\,cycle} = \frac{N_{ul\_slot\_pattern1} + N_{ul\_slot\_pattern2} + \left\lceil \frac{N_{ul\_symbols\_pattern1} + N_{ul\_symbols\_pattern2}}{N_{symb}^{slot}} \right\rceil}{(P_{pattern1} + P_{pattern2}) \cdot 2^\mu}$$

Alternatively (symbol level)

$$n_{duty\,cycle} = \frac{N_{symb}^{slot}(N_{ul\_slot\_pattern1} + N_{ul\_slot\_pattern2}) + N_{ul\_symbols\_pattern1} + N_{ul\_symbols\_pattern2}}{N_{symb}^{slot}(P_{pattern1} + P_{pattern2}) \cdot 2^\mu}$$

For the next step, the UE is only configured with the field pattern1 but some slots and OFDM symbols are assigned as flexible in addition to that some are UL. In an embodiment, the flexible resources are counted as UL for the duty cycle calculation in order to get the highest number of UL slots and OFDM symbols. In practice, the flexible slots and OFDM symbols can be either DL or UL.

$N_{dl\_slot\_pattern1}$=the value of the field nrofDownlinkSlots in the IE TDD-UL-DL-Pattern that is the type for pattern1.

$N_{dl\_symbols\_pattern1}$=the value of the field nrofDownlinkSymbols in IE TDD-UL-DL-Pattern that is the type for pattern1.

$N_{flexible\_slot\_pattern1} = P_{pattern1} \cdot 2^\mu - N_{ul\_slot\_pattern1} - N_{dl\_slot\_pattern1}$ $N_{flexible\_symbol\_pattern1} =$ $N_{flexible\_slot\_pattern1} N_{symb}^{slot} - N_{dl\_symbols\_pattern1} - N_{ul\_symbols\_pattern1}$ $$n_{duty\,cycle} = \frac{N_{ul\_slot\_pattern1} + N_{flexible\_slot\_pattern1} + \left\lceil \frac{N_{ul\_symbols\_pattern1}}{N_{symb}^{slot}} \right\rceil + \left\lceil \frac{N_{flexible\_symbols\_pattern1}}{N_{symb}^{slot}} \right\rceil}{(P_{pattern1}) \cdot 2^\mu}$$

Alternatively:

$$n_{duty\,cycle} = \frac{N_{ul\_slot\_pattern1} + N_{flexible\_slot\_pattern1} + \left\lceil \frac{N_{ul\_symbols\_pattern1} + N_{flexible\_symbols\_pattern1}}{N_{symb}^{slot}} \right\rceil}{(P_{pattern1}) \cdot 2^\mu}$$

Alternatively (symbol level):

$$n_{duty\,cycle} = \frac{(N_{ul\_slot\_pattern1} + N_{flexible\_slot\_pattern1})N_{symb}^{slot} + N_{ul\_symbols\_pattern1} + N_{flexible\_symbols\_pattern1}}{(N_{symb}^{slot} P_{pattern1}) \cdot 2^\mu}$$

It is further possible to extend this to including a configuration of pattern2 in addition of pattern1 wherein both or one of the patterns has flexible slots or symbols. The duty cycle is in that case calculated as follows:

$N_{dl\_slot\_pattern2}$=the value of the field nrofDownlinkSlots in the IE TDD-UL-DL-Pattern that is the type for pattern2.

$N_{dl\_symbols\_pattern2}$=the value of the field nrofDownlinkSymbols in the IE TDD-UL-DL-Pattern that is the type for pattern2.

$$N_{flexible\_slot\_pattern2} = P_{pattern2} \cdot 2^{\mu} - N_{ul\_slot\_pattern2} - N_{dl\_slot\_pattern2}$$

$$N_{flexible\_symbol\_pattern2} = N_{flexible\_slot\_pattern2} N_{symb}^{slot} - N_{dl\_symbols\_pattern2} - N_{ul\_symbols\_pattern2}$$

$$n_{duty\ cycle} = \frac{N_{ul\_slot\_pattern1} + N_{ul\_slot\_pattern2} + N_{flexible\_slot\_pattern1} + N_{flexible\_slot\_pattern2}}{(P_{pattern1} + P_{pattern2}) \cdot 2^{\mu}} + \frac{\left\lceil \frac{N_{ul\_symbols\_pattern1}}{N_{symb}^{slot}} \right\rceil + \left\lceil \frac{N_{ul\_symbols\_pattern2}}{N_{symb}^{slot}} \right\rceil + \left\lceil \frac{N_{flexible\ symbols\ pattern1}}{N_{symb}^{slot}} \right\rceil + \left\lceil \frac{N_{flexible\_symbols\_pattern2}}{N_{symb}^{slot}} \right\rceil}{(P_{pattern1} + P_{pattern2}) \cdot 2^{\mu}}$$

Alternatively (slot level):

$$n_{duty\ cycle} = \frac{N_{ul\_slot\_pattern1} + N_{ul\_slot\_pattern2} + N_{flexible\_slot\_pattern1} + N_{flexible\_slot\_pattern2}}{(P_{pattern1} + P_{pattern2}) \cdot 2^{\mu}} + \frac{\left\lceil \frac{N_{ul\_symbols\_pattern1} + N_{flexible\_symbols\_pattern1}}{N_{symb}^{slot}} \right\rceil + \left\lceil \frac{N_{ul\_symbols\_pattern2} + N_{flexible\_symbols\_pattern2}}{N_{symb}^{slot}} \right\rceil}{(P_{pattern1} + P_{pattern2}) \cdot 2^{\mu}}$$

Alternatively (slot level):

$$n_{duty\ cycle} = \frac{N_{ul\_slot\_pattern1} + N_{ul\_slot\_pattern2} + N_{flexible\_slot\_pattern1} + N_{flexible\_slot\_pattern2}}{(P_{pattern1} + P_{pattern2}) \cdot 2^{\mu}} + \frac{\left\lceil \frac{N_{ul\_symbols\_pattern1} + N_{flexible\_symbols\_pattern1} + N_{ul\_symbols\_pattern2} + N_{flexible\_symbols\_pattern2}}{N_{symb}^{slot}} \right\rceil}{(P_{pattern1} + P_{pattern2}) \cdot 2^{\mu}}$$

Alternatively (symbol level):

$$n_{duty\ cycle} = N_{symb}^{slot} \frac{(N_{ul\_slot\_pattern1} + N_{ul\_slot\_pattern2} + N_{flexible\_slot\_pattern1} + N_{flexible\_slot\_pattern2})}{(P_{pattern1} + P_{pattern2}) \cdot 2^{\mu}} + \frac{N_{ul\_symbols\_pattern1} + N_{flexible\_symbols\_pattern1} + N_{ul\_symbols\_pattern2} + N_{flexible\_symbols\_pattern2}}{N_{symb}^{slot}(P_{pattern1} + P_{pattern2}) \cdot 2^{\mu}}$$

An alternative to the above is to calculate the duty cycle based on the number of downlink slots and downlink OFDM symbols. The target being still to count the duty cycle for UL. It is clear that this will yield the same value. In that case it is calculated/determined as follows:

Alternative (slot level based):

$$n_{duty\ cycle} = 1 - \frac{(N_{dl\_slot\_pattern1} + N_{dl\_slot\_pattern2} + \left\lceil \frac{N_{dl\_symbols\_pattern1}}{N_{symb}^{slot}} \right\rceil + \left\lceil \frac{N_{dl\_symbols\_pattern2}}{N_{symb}^{slot}} \right\rceil)}{(P_{pattern1} + P_{pattern2}) \cdot 2^{\mu}}$$

Alternative (slot level based):

$$n_{duty\ cycle} = 1 - \frac{(N_{dl\_slot\_pattern1} + N_{dl\_slot\_pattern2} + \left\lceil \frac{N_{dl\_symbols\_pattern1} + N_{dl\_symbols\_pattern2}}{N_{symb}^{slot}} \right\rceil)}{(P_{pattern1} + P_{pattern2}) \cdot 2^{\mu}}$$

Alternative (symbol level based):

$$n_{duty\ cycle} = 1 - \left( N_{symb}^{slot} \frac{(N_{dl\_slot\_pattern1} + N_{dl\_slot\_pattern2})}{(P_{pattern1} + P_{pattern2}) \cdot 2^{\mu}} + \frac{N_{dl\_symbols\_pattern1} + N_{dl\_symbols\_pattern2}}{N_{symb}^{slot}(P_{pattern1} + P_{pattern2}) \cdot 2^{\mu}} \right)$$

The rules above can be captured in the specifications for NR as follows in power control equations that depends on the uplink duty cycle:

The UE determines the duty cycle up for the configured maximum output power as follows:

if the UE is only provided with a common pattern tdd-UL-DL-ConfigurationCommon that provides pattern1 an upper bound on the duty cycle is determined by the quotient of the difference between the total number of symbols for the configuration period of pattern1 for the reference SCS and the total number of downlink symbols of the configuration period, and the total number of slots for the configuration period of pattern1 for the reference SCS.

as indicated by tdd-UL-DL-ConfigurationCommon.

if the UE is only provided with a common pattern tdd-UL-DL-ConfigurationCommon that provides both pattern1 and pattern2 an upper bound on the duty cycle is determined by the quotient of the difference between the total number of symbols for the configuration periods of pattern1 and pattern2 for the reference SCS and the total number of downlink symbols of both configuration periods and the total number of slots for the configuration periods of pattern1 and pattern2 for the reference SCS, as indicated by tdd-UL-DL-ConfigurationCommon.

In addition to the above, the UE can be configured with via RRC with a UE specific pattern that modifies the cell specific pattern. This through the field tdd-UL-DL-ConfigurationDedicated that is of the type IE TDD-UL-DL-ConfigDedicated in the IE ServingCellConfig. That configuration modifies the above patterns in terms of the number of DL or UL slots and correspondingly the calculation of the duty cycle needs to be modified in the same manner. It is given in [3] in section 11.1 that the TDD-UL-DL-ConfigDedicated only overrides the symbols or slots that are signaled as flexible. Hence if the determining part above is done based on both flexible and UL symbols and slots this signaling will not have any effect on the duty cycle. If however the determining/calculation done above is based on only UL then the UE shall consider the dedicated signaling in counting the number of UL symbols or slots in a similar way as above but add does additional one that is signaled in the dedicated pattern being UL.

If the UE operates NR UL carrier aggregation the UE should be before it determines/calculates the duty cycle compare the applicable TDD pattern on all NR carriers within a certain frequency spectrum range. This to derive a common UL-DL-pattern across the different carriers/cells, that it can be assign UL resource on. The range being either FR1, FR1+FR2, FR2 or any other frequency range in a similar manner, where FR1 is =410–7125 MHz and FR2=24250–52600 MHz. Comparing should be done so that if any OFDM symbol/slot is UL at any of the UL carriers it should count as an UL symbol/slot. The duty cycle is a common duty cycle across all NR UL carriers. The duty cycle can be calculated over 20 ms or any short time frame than 20 ms that is an integer number of all the UL-DL-TDD patterns on all the different cells. This since the patterns needs to be an integer number over a 20 ms periodicity.

If the subcarrier spacing is the same across all cells/carriers that have any UL resource the UE compares the different TDD-UL-DL patterns across all the different cell/carriers on a symbol by symbol basis. UL resource implies that the UE can be assigned UL resource on that carrier, e.g. transmitting PUCCH, PRACH, PUSCH or SRS or any other type of UL channel or signal. If any carrier/cell as one OFDM symbol that is assigned to UL or flexible this is counted in a common pattern across all the aggregated cells. In this calculation a slot that is assigned to UL or flexible is translated into $N_{symb}^{slot}$ symbols of either UL or flexible. In an alternative to this only OFDM symbols that are assigned as UL is counted in the common pattern across all aggregated cells. Another version as highlight above is that the UE just calculates the number of DL symbols and slots that are common across all aggregated cells on an OFDM symbol by OFDM symbol basis. If it is not DL across all the aggregated cells/carrier (that are configured for UL CA) it is not counted as DL. After the common pattern is determined/calculated the UE applies the procedure described earlier to calculated duty cycle but instead of using the RRC signaled pattern it uses a pattern determined/calculated in the UE to do the same operation. When applying the above calculation the periodicities need to be adapted to match that of the common pattern that is derived during the operation described here.

The UE then applies the UL-DL-TDD common pattern in a similar way as describes above, it is however important to note that the UL-DL-TDD common pattern is not signaled from the network to the UE but is derived inside the UE and hence the references above to the different fields in the RRC specification should in that case be viewed in light of this and more as to how the calculation can be done on general level rather than specifically using that parameter.

If the subcarrier spacing is different, a time wise comparison is done between the different aggregated cells/carriers wherein if there is any UL alternatively flexible OFDM symbols this is counted as an UL resource in the duty cycle. In more detail, one way of calculating this is that if the subcarrier spacing is different across the different aggregated cells/carriers, the UE would first need to translate number of allocated slots into common subcarrier spacing across all the aggregated carrier and cells. For finest resolution, the highest subcarrier among the aggregated cells can be chosen to do that. That said any subcarrier spacing is possible to choose for this purpose. If the highest subcarrier spacing is chosen. The UL-DL-TDD pattern for a carrier/cell that is using a lower subcarrier is translated into a higher subcarrier spacing by the number of total OFDM symbols is increase in the pattern to match this in the higher subcarrier spacing. As an example, an OFDM symbol with 15 kHz can translated into 2 OFDM symbols with 30 kHz, or 4 OFDM symbols with 60 kHz or 8 OFDM symbols with 120 KHz. The OFDM symbols all having the same direction. After this the procedure for the same subcarrier spacing is applied. The duty cycle can be calculated over 20 ms or any short time frame than 20 ms that is an integer number of all the UL-DL-TDD patterns on all the different cells. This since the patterns needs to be an integer number over a 20 ms periodicity.

Considering subcarrier adjustment, another version as highlighted above is that the UE just calculates the number of DL symbols and slots that are common across all aggregated cells on an OFDM symbol by OFDM symbol basis. If it is not DL across all the aggregated cells/carrier (that are configured for UL CA) it is not counted as DL. After the common pattern is determined/calculated the UE applies the procedure described earlier to calculated duty cycle but instead of using the RRC signaled pattern it uses a pattern determined/calculated in the UE to do the same operation. When applying the above calculation, the periodicities needs to be adapted to match that of the common pattern that is derived during the operation described here.

If one of the carriers applies extended cyclic prefix instead of normal cyclic prefix the overhead calculation can be done on a slot level basis instead of a symbol level basis as the slot boundaries are aligned across the normal and extended CP. Alternatively the times overlap between the different patterns are applied just. If any part in the overlap is either flexible or UL the OFDM symbol is counted as UL, alternatively this is just done for UL.

Lastly it is possible for the UE to apply an adaptive duty cycle, wherein the duty cycle changes on a scheduling basis. The UE would in such a procedure count the number of scheduled OFDM symbols across all its aggregated cell (or assigned OFDM symbols for UL by DCI format 2_2 (i.e. SFI)). The duty cycle would be counted during a certain periodicity for example 20 ms, the 20 ms could either be a fix 20 ms period or a 20 ms floating window. In a first version the UE would count the number UL symbols within that give period and adapt duty cycle based on that. This assuming maximum transmit power from the UE. The UE would then do this across all its aggregated cells that support carrier aggregation and determine a duty cycle constantly.

LTE Duty Cycle

For LTE operation it is further possible to derive a duty cycle. In LTE the network operates one out seven Uplink-downlink configurations. If the UE is not configured with CA on the LTE side it applies a single Uplink-downlink configuration and one special subframe configuration.

The periodicity of the total pattern can be as long as 20 ms, but should always fulfill the condition that 20/(periodicity of pattern) is an integer. Since the Uplink-downlink configuration are pre-known it is possible to determine in advance what the duty cycle is or the UE determines this at a later stage. Without considering the UpPTS, the duty cycle is as shown in Table 2:

TABLE 2

| | | U/D Configuration | | | | | | | | | | |
|---|---|---|---|---|---|---|---|---|---|---|---|---|
| Duty cycle | Uplink-downlink configuration | Subframe number | | | | | | | | | | |
| | | 0 | 1 | 2 | 3 | 4 | 5 | 6 | 7 | 8 | 9 |
| 0.6 + 2*UpPTS | 0 | D | S | U | U | U | D | S | U | U | U |
| 0.4 + 2*UpPTS | 1 | D | S | U | U | D | D | S | U | U | D |
| 0.2 + 2*UpPTS | 2 | D | S | U | D | D | D | S | U | D | D |
| 0.3 + UpPTS | 3 | D | S | U | U | U | D | D | D | D | D |
| 0.2 + UpPTS | 4 | D | S | U | U | D | D | D | D | D | D |
| 0.1 + UpPTS | 5 | D | S | U | D | D | D | D | D | D | D |
| 0.5 + 2*UpPTS | 6 | D | S | U | U | U | D | S | U | U | D |

The extra duty cycle added from UpPTS corresponds to the following shown in Table 3 assuming normal cyclic prefix in both DL and UL. The variable $T_s$ being defined within [1] and X is the number of additional SC-FDMA symbols in UpPTS provided by the higher layer parameter srs-UpPtsAdd if configured otherwise X is equal to 0 as defined within [1].

TABLE 3

Duty Cycle for UpPTS

| Duty cyle for UpPTS | Special subframe configuration | DwPTS | UpPTS duration |
|---|---|---|---|
| $\frac{(1+X) \cdot 2192 \cdot T_S}{10 \cdot 30720 \cdot T_S}$ | 0 | $6592 \cdot T_s$ | $(1+X) \cdot 2192 \cdot T_s$ |
| $\frac{(1+X) \cdot 2192 \cdot T_S}{10 \cdot 30720 \cdot T_S}$ | 1 | $19760 \cdot T_s$ | |
| $\frac{(1+X) \cdot 2192 \cdot T_S}{10 \cdot 30720 \cdot T_S}$ | 2 | $21952 \cdot T_s$ | |
| $\frac{(1+X) \cdot 2192 \cdot T_S}{10 \cdot 30720 \cdot T_S}$ | 3 | $24144 \cdot T_s$ | |
| $\frac{(1+X) \cdot 2192 \cdot T_S}{10 \cdot 30720 \cdot T_S}$ | 4 | $26336 \cdot T_s$ | |
| $\frac{(2+X) \cdot 2192 \cdot T_S}{10 \cdot 30720 \cdot T_S}$ | 5 | $6592 \cdot T_s$ | $(2+X) \cdot 2192 \cdot T_s$ |
| $\frac{(2+X) \cdot 2192 \cdot T_S}{10 \cdot 30720 \cdot T_S}$ | 6 | $19760 \cdot T_s$ | |
| $\frac{(2+X) \cdot 2192 \cdot T_S}{10 \cdot 30720 \cdot T_S}$ | 7 | $21952 \cdot T_s$ | |
| $\frac{(2+X) \cdot 2192 \cdot T_S}{10 \cdot 30720 \cdot T_S}$ | 8 | $24144 \cdot T_s$ | |
| $\frac{(2+X) \cdot 2192 \cdot T_S}{10 \cdot 30720 \cdot T_S}$ | 9 | $13168 \cdot T_s$ | |
| $\frac{13152 \cdot T_S}{10 \cdot 30720 \cdot T_S}$ | 10 | $13168 \cdot T_s$ | $13152 \cdot T_s$ |

If the LTE UE is configured with carrier aggregation and for the carriers it is operating UL and for which a reference configuration is available applies the TDD configuration reference configuration when calculating the duty cycle. The reference configuration is further used for scheduling purpose.

The UL duty cycle can further be modified by the UE due to any of the following listed aspects:

Device heat management, e.g. the device is potentially getting too warm and hence needs to back off in power to not get overheated or having to high current form the battery. The device could be overheated due to the heat of components related to radio technology, e.g. PA, baseband chip and so on. The UE could also be overheated due to other factors such as external temperature, high usage of general-purpose processer and so on.

If the UE is in DRX it does not receive any DL associated information and hence is not either scheduled in the UL on any resource by the network. Hence it will not transmit anything in the UL based on scheduling from the RAN and can therefore adjust its duty cycle as it is not using all the available UL resources. The UE could still in DRX trigger UL transmissions by itself on specific preconfigured resources such as scheduling request, PRACH, SPS transmission on PUSCH or configured UL grants on PUSCH.

The UE is configured with measurement gaps to be able to measure other frequencies. During that measurement gap time period the UE is not required to transmit or receive on its operational carriers and could therefore adjust the duty cycle based on its measurement gap configuration. Adjusting the duty cycle could include reducing the duty cycle.

The UE may further need to reduce its duty cycle to support SAR and proximity detection. SAR and proximity detection requirements are usually measured over a relative long time periods, i.e. significantly larger than a slot length. If the UE has had too high transmission activity it may need to reduce its output power in order to comply with the corresponding requirement.

The UE may further adjust its duty cycle when it is not capable of transmitting and receiving at the same time. This becomes relevant when operating for example CA or dual connectivity wherein the UE maybe need to receive DL on one or multiple carriers and hence is not able to transmit on a given carrier or carriers at the same time. If the UE is not able to transmit and receive at the same time it could indicate this as a capability to the network. This capability could for example be limited to a certain set of bands or band only. It may also not extend to FR2 if the capability is for FR1.

The UE's duty cycle may further be modified due to a requirement that the UE must apply one more MPRs on a given carrier, so that the UE cannot operate with its maximum transmit power on that carrier.

The UE's duty cycle on FR1 may be modified due to a high duty cycle on FR2. Note here that the power control on FR2 is separate from the power control on FR1. However, the UE still needs to handle some common aspects within the device such as heat management or SAR requirements and hence if there is high duty cycle on FR2 the UE may need to adjust the duty cycle on FR1.

The UE may further adjust the duty cycle based on transmission on other radio access technologies. The other radio access technology can be for example WiFi or CDMA2000. It can also be a separate 3G, LTE or NR connection the UE has. The UE may such a separate connection if it for example supports multiple SIM cards. Note that the SIM card can be an electronic SIM cards and does not need to be a physical SIM card.

Figure 4:
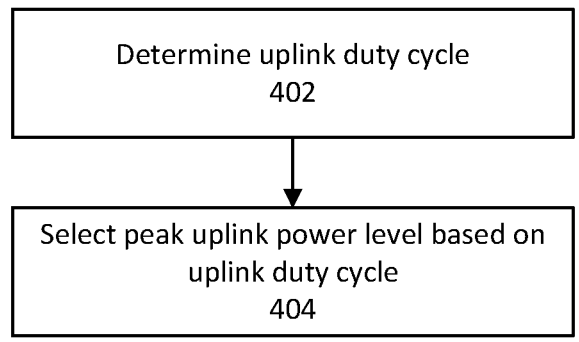
FIGS. 4 and 5 are flowcharts that illustrate operations of a UE according to some embodiments.

FIG. 4 illustrates operations of a UE according to some embodiments, where the UE is served by a radio access network (RAN). As shown therein, the method includes determining (402) an uplink duty cycle for uplink transmission by the UE to the RAN; and selecting (404) a peak uplink power level in response to the determined duty cycle.

Figure 5:
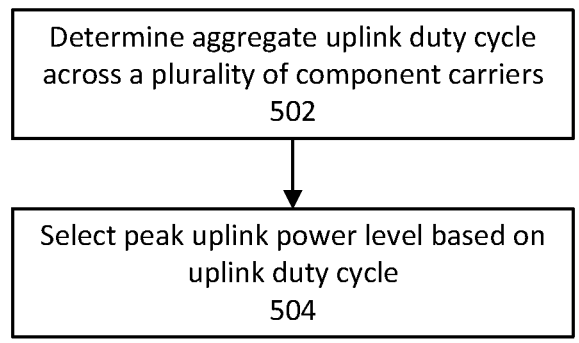

FIG. 5 illustrates operations of a UE served by a RAN and that communicates with the RAN via a plurality of component carriers. As shown therein, the operations include determining (502) an aggregate uplink duty cycle based on scheduled uplink time intervals across the plurality of component carriers; and selecting (504) a peak uplink transmission power level for transmitting uplink signals on the plurality of component carriers in response to the determined aggregate uplink duty cycle.

In some embodiments, determining the uplink duty cycle comprises determining the uplink duty cycle based on a common time division duplexing, TDD, uplink/downlink pattern provided by a network node in the RAN.

In some embodiments, determining the uplink duty cycle comprises determining the uplink duty cycle based on a dedicated uplink/downlink pattern provided by a network node in the RAN.

In some embodiments, determining the uplink duty cycle comprises determining the uplink duty cycle based on a slot format indicator, SFI, provided by a network node in the RAN.

In some embodiments, the uplink duty cycle represents a fraction of time in a time period during which the UE is scheduled to transmit uplink signals to the RAN.

In some embodiments, the uplink duty cycle represents a fraction of time in a time period that is reserved for transmission of uplink signals to the RAN.

In some embodiments, the uplink duty cycle represents a fraction of time in a time period that is reserved for transmission of uplink signals to the RAN or that is reserved for flexible time slots.

In some embodiments, the time period is a frame.

In some embodiments, the uplink duty cycle is determined on a timeslot by timeslot basis.

In some embodiments, the uplink duty cycle is determined on a symbol by symbol basis.

In some embodiments, the uplink duty cycle is determined based on a number of slots or symbols reserved for downlink communications in a given time period.

In some embodiments, the UE connected to the RAN via carrier aggregation, and wherein the uplink duty cycle is determined across a plurality of component carriers.

In some embodiments, the uplink duty cycle is determined based on a number of time intervals that are reserved for uplink transmission on any of the plurality of component carriers.

In some embodiments, the uplink duty cycle is determined based on a number of time intervals that are reserved for uplink transmission or that are available for uplink or downlink communications on any of the plurality of component carriers.

In some embodiments, the UE is connected to a first cell group served by a new radio, NR, network node and to a second cell group served by a long term evolution, LTE, node via dual connectivity, and wherein the duty cycle is determined based on an uplink/downlink configuration provided for the second cell group and based on a common time division duplexing, TDD, uplink/downlink pattern, dedicated uplink/downlink pattern and/or slot frame indicator, SFI, provided for the first cell group.

In some embodiments, the duty cycle is determined as a N/P, where N is a number of time intervals in a given time period in which the UE is scheduled to transmit uplink communications and P is a total number of time intervals in the time period.

In some embodiments, the UE selects a peak uplink power for user during a time period such that an average uplink power during the time period is less than a predetermined power level.

In some embodiments, the predetermined power level is 23 dBm.

In some embodiments, duty cycle is modified due to device heat management.

In some embodiments, the duty cycle is modified due to Discontinuous Transmission, DTX, or Discontinuous Reception, DRX.

In some embodiments, the duty cycle is modified due to measurement gaps.

In some embodiments, the duty cycle is modified SAR and proximity detection.

In some embodiments, the duty cycle is modified for carrier aggregation due to UE capability to transmit and receive simultaneously.

In some embodiments, the duty cycle is modified due to any type of maximum power reduction, MPR, that is associated with the UEs operating bands.

In some embodiments, the duty cycle on FR1 is modified due to the UL transmissions on FR2 or FR2 duty cycle.

In some embodiments, the duty cycle is adjusted based on transmission on another radio access technology, wherein other radio access technology can be WiFi, CDMA2000 or another LTE or NR connection.

In some embodiments, the RAN node is either an eNB or gNB.

In some embodiments, the RAN is either NR or E-UTRAN.

The methods may include transmitting uplink communications using the selected peak uplink transmission power level.

EXAMPLE EMBODIMENTS

The following enumerated clauses provide some exemplary embodiments of the present disclosure.

Embodiment 1

A method of operating a user equipment, UE, that is served by a radio access network, RAN, the method comprising:
 determining (402) an uplink duty cycle for uplink transmission by the UE to the RAN; and
 selecting (404) a peak uplink power level in response to the determined duty cycle.

Embodiment 2

The method of Embodiment 1, wherein determining the uplink duty cycle comprises determining the uplink duty cycle based on a common time division duplexing, TDD, uplink/downlink pattern provided by a network node in the RAN.

Embodiment 3

The method of Embodiment 1, wherein determining the uplink duty cycle comprises determining the uplink duty cycle based on a dedicated uplink/downlink pattern provided by a network node in the RAN.

Embodiment 4

The method of Embodiment 1, wherein determining the uplink duty cycle comprises determining the uplink duty cycle based on a slot format indicator, SFI, provided by a network node in the RAN.

Embodiment 5

The method of any previous Embodiment, wherein the uplink duty cycle represents a fraction of time in a time period during which the UE is scheduled to transmit uplink signals to the RAN.

Embodiment 6

The method of any of Embodiments 1 to 4, wherein the uplink duty cycle represents a fraction of time in a time period that is reserved for transmission of uplink signals to the RAN.

Embodiment 7

The method of any of Embodiments 1 to 4, wherein the uplink duty cycle represents a fraction of time in a time period that is reserved for transmission of uplink signals to the RAN or that is reserved for flexible time slots.

Embodiment 8

The method of any of Embodiments 5 to 7, wherein the time period is a frame.

Embodiment 9

The method of any previous Embodiment, wherein the uplink duty cycle is determined on a timeslot by timeslot basis.

Embodiment 10

The method of any of Embodiments 1 to 8, wherein the uplink duty cycle is determined on a symbol by symbol basis.

Embodiment 11

The method of any previous Embodiment, wherein the uplink duty cycle is determined based on a number of slots or symbols reserved for downlink communications in a given time period.

Embodiment 12

The method of any previous Embodiment, wherein the UE connected to the RAN via carrier aggregation, and wherein the uplink duty cycle is determined across a plurality of component carriers.

Embodiment 13

The method of Embodiment 12, wherein the uplink duty cycle is determined based on a number of time intervals that are reserved for uplink transmission on any of the plurality of component carriers.

Embodiment 14

The method of Embodiment 12, wherein the uplink duty cycle is determined based on a number of time intervals that are reserved for uplink transmission or that are available for uplink or downlink communications on any of the plurality of component carriers.

Embodiment 15

The method of any previous Embodiment, wherein the UE is connected to a first cell group served by a new radio, NR, network node and to a second cell group served by a long term evolution, LTE, node via dual connectivity, and wherein the duty cycle is determined based on an uplink/downlink configuration provided for the second cell group and based on a common time division duplexing, TDD, uplink/downlink pattern, dedicated uplink/downlink pattern and/or slot frame indicator, SFI, provided for the first cell group.

Embodiment 16

The method of any previous Embodiment, wherein the duty cycle is determined as a N/P, where N is a number of time intervals in a given time period in which the UE is scheduled to transmit uplink communications and P is a total number of time intervals in the time period.

Embodiment 17

The method of any previous Embodiment, wherein the UE selects a peak uplink power for user during a time period such that an average uplink power during the time period is less than a predetermined power level.

Embodiment 18

The method of Embodiment 17, wherein the predetermined power level is 23 dBm.

Embodiment 19

The method of any previous Embodiment, wherein the duty cycle is modified due to device heat management.

Embodiment 20

The method of any previous Embodiment, wherein the duty cycle is modified due to Discontinuous Transmission, DTX, or Discontinuous Reception, DRX.

Embodiment 21

The method of any previous Embodiment, wherein the duty cycle is modified due to measurement gaps.

Embodiment 22

The method of any previous Embodiment, wherein the duty cycle is modified SAR and proximity detection.

Embodiment 22A

The method of any previous Embodiment, wherein the duty cycle is modified for carrier aggregation due to UE capability to transmit and receive simultaneously.

Embodiment 23

The method of any previous Embodiment, wherein the duty cycle is modified due to any type of maximum power reduction, MPR, that is associated with an operating band of the UE.

Embodiment 24

The method of any previous Embodiment, wherein the duty cycle on FR1 is modified due to the UL transmissions on FR2 or FR2 duty cycle.

Embodiment 25

The method of any previous Embodiment, wherein the duty cycle is adjusted based on transmission on another radio access technology, wherein other radio access technology can be WiFi, CDMA2000 or another LTE or NR connection.

Embodiment 26

The method of any previous Embodiment, wherein the RAN node is either an eNB or gNB.

Embodiment 27

The method of any previous Embodiment, wherein the RAN is either NR or E-UTRAN.

Embodiment 28

A method of operating a user equipment, UE, that communicates with a radio access network, RAN via a plurality of component carriers, the method comprising:
  determining (502) an aggregate uplink duty cycle based on scheduled uplink time intervals across the plurality of component carriers; and
  selecting (504) a peak uplink transmission power level for transmitting uplink signals on the plurality of component carriers in response to the determined aggregate uplink duty cycle.

Embodiment 29

The method of any previous Embodiment, further comprising transmitting uplink communications using the selected peak uplink transmission power level.

Embodiment 30

A user equipment, UE, node (100), configured to perform operations of any of Embodiments 1 to 29.

Embodiment 31

A user equipment, UE, node (100), comprising:
  a processor (103);
  a wireless transceiver (102) coupled to the processor; and
  a memory (105) coupled to the processor, wherein the memory comprises computer readable instructions that, when executed by the processor, cause the UE to perform operations according to any of Embodiments 1 to 29.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 6:
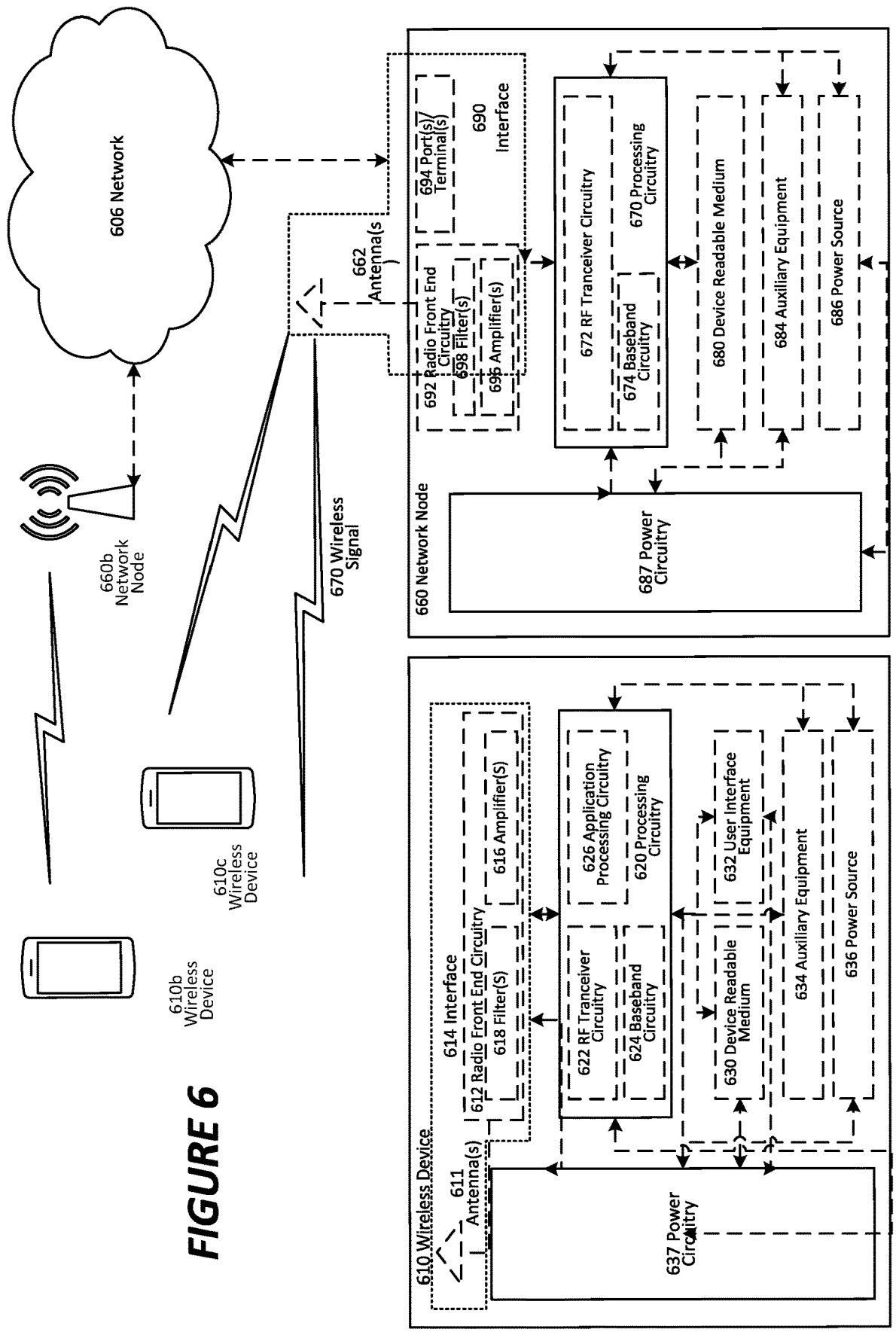
FIG. 6 is a block diagram of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 606, network nodes 660 and 660*b*, and WDs 610, 610*b*, and 610*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 660 and wireless device (WD) 610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 660 and WD 610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 660 includes processing circuitry 670, device readable medium 680, interface 690, auxiliary equipment 684, power source 686, power circuitry 687, and antenna 662. Although network node 660 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 660 are depicted as single boxes located within a larger box, or nested within multiple boxes, in practice, a network node may comprise multiple different physical components that make up a single illustrated component (e.g., device readable medium 680 may comprise multiple separate hard drives as well as multiple RAM modules).

Similarly, network node 660 may be composed of multiple physically separate components (e.g., a NodeB component and a RNC component, or a BTS component and a BSC component, etc.), which may each have their own respective components. In certain scenarios in which network node 660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 660 may be configured to support multiple radio access technologies (RATs). In such embodiments, some components may be duplicated (e.g., separate device readable medium 680 for the different RATs) and some components may be reused (e.g., the same antenna 662 may be shared by the RATs). Network node 660 may also include multiple sets of the various illustrated components for different wireless technologies integrated into network node 660, such as, for example, GSM, WCDMA, LTE, NR, WiFi, or Bluetooth wireless technologies. These wireless technologies may be integrated into the same or different chip or set of chips and other components within network node 660.

Processing circuitry 670 is configured to perform any determining, calculating, or similar operations (e.g., certain obtaining operations) described herein as being provided by a network node. These operations performed by processing circuitry 670 may include processing information obtained by processing circuitry 670 by, for example, converting the obtained information into other information, comparing the obtained information or converted information to information stored in the network node, and/or performing one or more operations based on the obtained information or converted information, and as a result of said processing making a determination.

Processing circuitry 670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 660 components, such as device readable medium 680, network node 660 functionality. For example, processing circuitry 670 may execute instructions stored in device readable medium 680 or in memory within processing circuitry 670. Such functionality may include providing any of the various wireless features, functions, or benefits discussed herein. In some embodiments, processing circuitry 670 may include a system on a chip (SOC).

In some embodiments, processing circuitry 670 may include one or more of radio frequency (RF) transceiver circuitry 672 and baseband processing circuitry 674. In some embodiments, radio frequency (RF) transceiver circuitry 672 and baseband processing circuitry 674 may be on separate chips (or sets of chips), boards, or units, such as radio units and digital units. In alternative embodiments, part or all of RF transceiver circuitry 672 and baseband processing circuitry 674 may be on the same chip or set of chips, boards, or units.

In certain embodiments, some or all of the functionality described herein as being provided by a network node, base station, eNB or other such network device may be performed by processing circuitry 670 executing instructions stored on device readable medium 680 or memory within processing circuitry 670. In alternative embodiments, some or all of the functionality may be provided by processing circuitry 670 without executing instructions stored on a separate or discrete device readable medium, such as in a hard-wired manner In any of those embodiments, whether executing instructions stored on a device readable storage medium or not, processing circuitry 670 can be configured to perform the described functionality. The benefits provided by such functionality are not limited to processing circuitry 670 alone or to other components of network node 660, but are enjoyed by network node 660 as a whole, and/or by end users and the wireless network generally.

Device readable medium 680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 670. Device readable medium 680 may store any suitable instructions, data or information, including a computer program, software, an application including one or more of logic, rules, code, tables, etc. and/or other instructions capable of being executed by processing circuitry 670 and, utilized by network node 660. Device readable medium 680 may be used to store any calculations made by processing circuitry 670 and/or any data received via interface 690. In some embodiments, processing circuitry 670 and device readable medium 680 may be considered to be integrated.

Interface 690 is used in the wired or wireless communication of signalling and/or data between network node 660, network 606, and/or WDs 610. As illustrated, interface 690 comprises port(s)/terminal(s) 694 to send and receive data, for example to and from network 606 over a wired connection. Interface 690 also includes radio front end circuitry 692 that may be coupled to, or in certain embodiments a part of, antenna 662. Radio front end circuitry 692 comprises filters 698 and amplifiers 696. Radio front end circuitry 692 may be connected to antenna 662 and processing circuitry 670. Radio front end circuitry may be configured to condition signals communicated between antenna 662 and processing circuitry 670. Radio front end circuitry 692 may receive digital data that is to be sent out to other network nodes or WDs via a wireless connection. Radio front end circuitry 692 may convert the digital data into a radio signal having the appropriate channel and bandwidth parameters using a combination of filters 698 and/or amplifiers 696. The radio signal may then be transmitted via antenna 662. Similarly, when receiving data, antenna 662 may collect radio signals which are then converted into digital data by radio front end circuitry 692. The digital data may be passed to processing circuitry 670. In other embodiments, the interface may comprise different components and/or different combinations of components.

In certain alternative embodiments, network node 660 may not include separate radio front end circuitry 692, instead, processing circuitry 670 may comprise radio front end circuitry and may be connected to antenna 662 without separate radio front end circuitry 692. Similarly, in some embodiments, all or some of RF transceiver circuitry 672 may be considered a part of interface 690. In still other embodiments, interface 690 may include one or more ports or terminals 694, radio front end circuitry 692, and RF transceiver circuitry 672, as part of a radio unit (not shown), and interface 690 may communicate with baseband processing circuitry 674, which is part of a digital unit (not shown).

Antenna 662 may include one or more antennas, or antenna arrays, configured to send and/or receive wireless signals. Antenna 662 may be coupled to radio front end circuitry 690 and may be any type of antenna capable of transmitting and receiving data and/or signals wirelessly. In some embodiments, antenna 662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 662 may be separate from network node 660 and may be connectable to network node 660 through an interface or port.

Antenna 662, interface 690, and/or processing circuitry 670 may be configured to perform any receiving operations and/or certain obtaining operations described herein as being performed by a network node. Any information, data and/or signals may be received from a wireless device, another network node and/or any other network equipment. Similarly, antenna 662, interface 690, and/or processing circuitry 670 may be configured to perform any transmitting operations described herein as being performed by a network node. Any information, data and/or signals may be transmitted to a wireless device, another network node and/or any other network equipment.

Power circuitry 687 may comprise, or be coupled to, power management circuitry and is configured to supply the components of network node 660 with power for performing the functionality described herein. Power circuitry 687 may receive power from power source 686. Power source 686 and/or power circuitry 687 may be configured to provide power to the various components of network node 660 in a form suitable for the respective components (e.g., at a voltage and current level needed for each respective component). Power source 686 may either be included in, or external to, power circuitry 687 and/or network node 660. For example, network node 660 may be connectable to an external power source (e.g., an electricity outlet) via an input circuitry or interface such as an electrical cable, whereby the external power source supplies power to power circuitry 687. As a further example, power source 686 may comprise a source of power in the form of a battery or battery pack which is connected to, or integrated in, power circuitry 687. The battery may provide backup power should the external power source fail. Other types of power sources, such as photovoltaic devices, may also be used.

Alternative embodiments of network node 660 may include additional components beyond those shown in FIG. 6 that may be responsible for providing certain aspects of the network node's functionality, including any of the functionality described herein and/or any functionality necessary to support the subject matter described herein. For example, network node 660 may include user interface equipment to allow input of information into network node 660 and to allow output of information from network node 660. This may allow a user to perform diagnostic, maintenance, repair, and other administrative functions for network node 660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V21), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 610 includes antenna 611, interface 614, processing circuitry 620, device readable medium 630, user interface equipment 632, auxiliary equipment 634, power source 636 and power circuitry 637. WD 610 may include multiple sets of one or more of the illustrated components for different wireless technologies supported by WD 610, such as, for example, GSM, WCDMA, LTE, NR, WiFi, WiMAX, or Bluetooth wireless technologies, just to mention a few. These wireless technologies may be integrated into the same or different chips or set of chips as other components within WD 610.

Antenna 611 may include one or more antennas or antenna arrays, configured to send and/or receive wireless signals, and is connected to interface 614. In certain alternative embodiments, antenna 611 may be separate from WD 610 and be connectable to WD 610 through an interface or port. Antenna 611, interface 614, and/or processing circuitry 620 may be configured to perform any receiving or transmitting operations described herein as being performed by a WD. Any information, data and/or signals may be received from a network node and/or another WD. In some embodiments, radio front end circuitry and/or antenna 611 may be considered an interface.

As illustrated, interface 614 comprises radio front end circuitry 612 and antenna 611. Radio front end circuitry 612 comprise one or more filters 618 and amplifiers 616. Radio front end circuitry 614 is connected to antenna 611 and processing circuitry 620, and is configured to condition signals communicated between antenna 611 and processing circuitry 620. Radio front end circuitry 612 may be coupled to or a part of antenna 611. In some embodiments, WD 610 may not include separate radio front end circuitry 612; rather, processing circuitry 620 may comprise radio front end circuitry and may be connected to antenna 611. Similarly, in some embodiments, some or all of RF transceiver circuitry 622 may be considered a part of interface 614. Radio front end circuitry 612 may receive digital data that is to be sent out to other network nodes or WDs via a wireless connection. Radio front end circuitry 612 may convert the digital data into a radio signal having the appropriate channel and bandwidth parameters using a combination of filters 618 and/or amplifiers 616. The radio signal may then be transmitted via antenna 611. Similarly, when receiving data, antenna 611 may collect radio signals which are then converted into digital data by radio front end circuitry 612. The digital data may be passed to processing circuitry 620. In other embodiments, the interface may comprise different components and/or different combinations of components.

Processing circuitry 620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 610 components, such as device readable medium 630, WD 610 functionality. Such functionality may include providing any of the various wireless features or benefits discussed herein. For example, processing circuitry 620 may execute instructions stored in device readable medium 630 or in memory within processing circuitry 620 to provide the functionality disclosed herein.

As illustrated, processing circuitry 620 includes one or more of RF transceiver circuitry 622, baseband processing circuitry 624, and application processing circuitry 626. In other embodiments, the processing circuitry may comprise different components and/or different combinations of components. In certain embodiments processing circuitry 620 of WD 610 may comprise a SOC. In some embodiments, RF transceiver circuitry 622, baseband processing circuitry 624, and application processing circuitry 626 may be on separate chips or sets of chips. In alternative embodiments, part or all of baseband processing circuitry 624 and application processing circuitry 626 may be combined into one chip or set of chips, and RF transceiver circuitry 622 may be on a separate chip or set of chips. In still alternative embodiments, part or all of RF transceiver circuitry 622 and baseband processing circuitry 624 may be on the same chip or set of chips, and application processing circuitry 626 may be on a separate chip or set of chips. In yet other alternative embodiments, part or all of RF transceiver circuitry 622, baseband processing circuitry 624, and application processing circuitry 626 may be combined in the same chip or set of chips. In some embodiments, RF transceiver circuitry 622 may be a part of interface 614. RF transceiver circuitry 622 may condition RF signals for processing circuitry 620.

In certain embodiments, some or all of the functionality described herein as being performed by a WD may be provided by processing circuitry 620 executing instructions stored on device readable medium 630, which in certain embodiments may be a computer-readable storage medium. In alternative embodiments, some or all of the functionality may be provided by processing circuitry 620 without executing instructions stored on a separate or discrete device readable storage medium, such as in a hard-wired manner In any of those particular embodiments, whether executing instructions stored on a device readable storage medium or not, processing circuitry 620 can be configured to perform the described functionality. The benefits provided by such functionality are not limited to processing circuitry 620 alone or to other components of WD 610, but are enjoyed by WD 610 as a whole, and/or by end users and the wireless network generally.

Processing circuitry 620 may be configured to perform any determining, calculating, or similar operations (e.g., certain obtaining operations) described herein as being performed by a WD. These operations, as performed by processing circuitry 620, may include processing information obtained by processing circuitry 620 by, for example, converting the obtained information into other information, comparing the obtained information or converted information to information stored by WD 610, and/or performing one or more operations based on the obtained information or converted information, and as a result of said processing making a determination.

Device readable medium 630 may be operable to store a computer program, software, an application including one or more of logic, rules, code, tables, etc. and/or other instructions capable of being executed by processing circuitry 620. Device readable medium 630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 620. In some embodiments, processing circuitry 620 and device readable medium 630 may be considered to be integrated. User interface equipment 632 may provide components that allow for a human user to interact with WD 610. Such interaction may be of many forms, such as visual, audial, tactile, etc. User interface equipment 632 may be operable to produce output to the user and to allow the user to provide input to WD 610. The type of interaction may vary depending on the type of user interface equipment 632 installed in WD 610. For example, if WD 610 is a smart phone, the interaction may be via a touch screen; if WD 610 is a smart meter, the interaction may be through a screen that provides usage (e.g., the number of gallons used) or a speaker that provides an audible alert (e.g., if smoke is detected). User interface equipment 632 may include input interfaces, devices and circuits, and output interfaces, devices and circuits. User interface equipment 632 is configured to allow input of information into WD 610, and is connected to processing circuitry 620 to allow processing circuitry 620 to process the input information. User interface equipment 632 may include, for example, a microphone, a proximity or other sensor, keys/buttons, a touch display, one or more cameras, a USB port, or other input circuitry. User interface equipment 632 is also configured to allow output of information from WD 610, and to allow processing circuitry 620 to output information from WD 610. User interface equipment 632 may include, for example, a speaker, a display, vibrating circuitry, a USB port, a headphone interface, or other output circuitry. Using one or more input and output interfaces, devices, and circuits, of user interface equipment 632, WD 610 may communicate with end users and/or the wireless network, and allow them to benefit from the functionality described herein.

Auxiliary equipment 634 is operable to provide more specific functionality which may not be generally performed by WDs. This may comprise specialized sensors for doing measurements for various purposes, interfaces for additional types of communication such as wired communications etc. The inclusion and type of components of auxiliary equipment 634 may vary depending on the embodiment and/or scenario.

Power source 636 may, in some embodiments, be in the form of a battery or battery pack. Other types of power sources, such as an external power source (e.g., an electricity outlet), photovoltaic devices or power cells, may also be used. WD 610 may further comprise power circuitry 637 for delivering power from power source 636 to the various parts of WD 610 which need power from power source 636 to carry out any functionality described or indicated herein. Power circuitry 637 may in certain embodiments comprise power management circuitry. Power circuitry 637 may additionally or alternatively be operable to receive power from an external power source; in which case WD 610 may be connectable to the external power source (such as an electricity outlet) via input circuitry or an interface such as an electrical power cable. Power circuitry 637 may also in certain embodiments be operable to deliver power from an external power source to power source 636. This may be, for example, for the charging of power source 636. Power circuitry 637 may perform any formatting, converting, or other modification to the power from power source 636 to make the power suitable for the respective components of WD 610 to which power is supplied.

Figure 7:
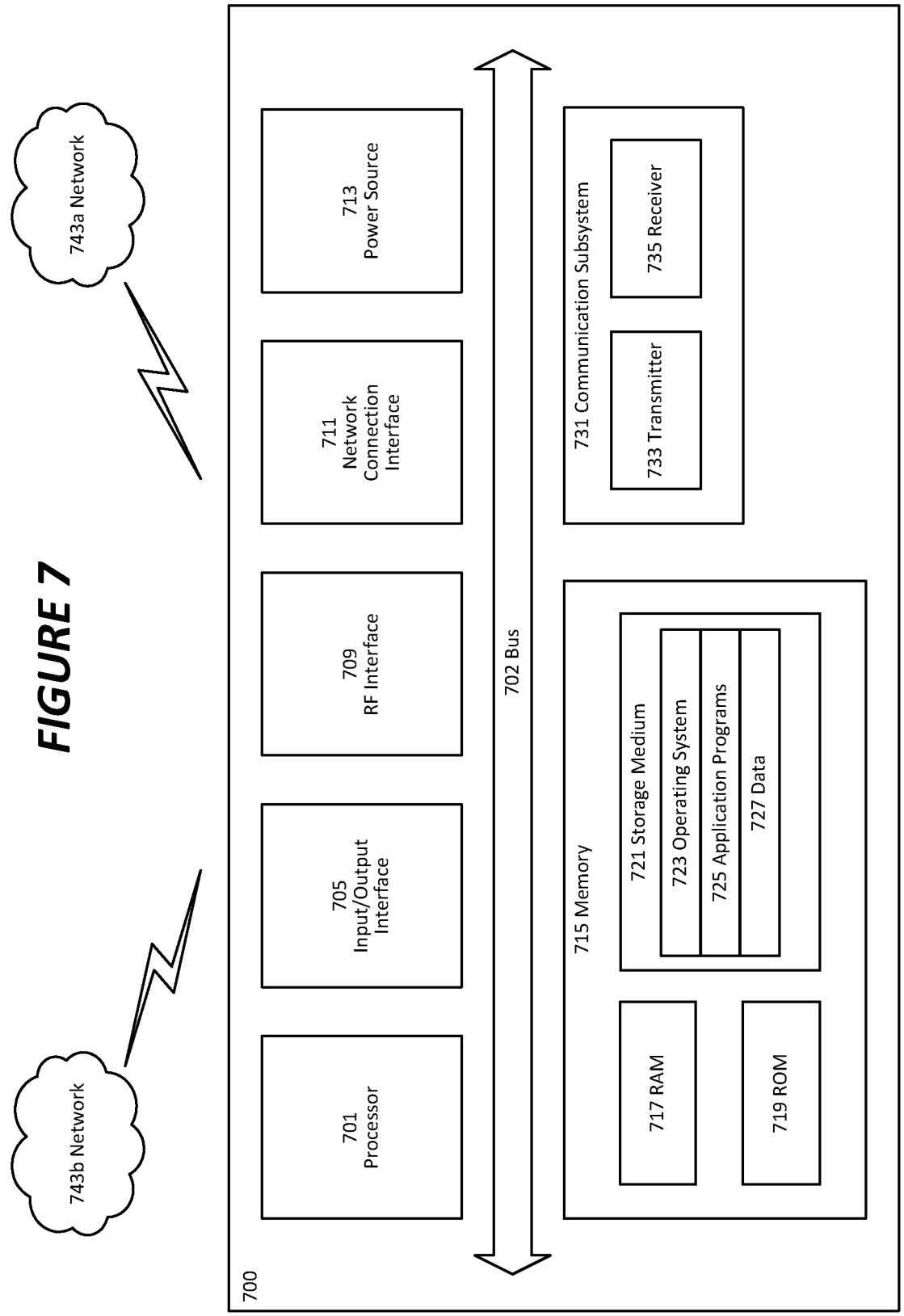
FIG. 7 is a block diagram of a user equipment in accordance with some embodiments.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 7200 may be any UE identified by the 3rd Generation Partnership Project (3GPP), including a NB-IoT UE, a machine type communication (MTC) UE, and/or an enhanced MTC (eMTC) UE. UE 700, as illustrated in FIG. 7, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 700 includes processing circuitry 701 that is operatively coupled to input/output interface 705, radio frequency (RF) interface 709, network connection interface 711, memory 715 including random access memory (RAM) 717, read-only memory (ROM) 719, and storage medium 721 or the like, communication subsystem 731, power source 733, and/or any other component, or any combination thereof. Storage medium 721 includes operating system 723, application program 725, and data 727. In other embodiments, storage medium 721 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 701 may be configured to process computer instructions and data. Processing circuitry 701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 701 may include two central processing units (CPUs). Data may be information in a form suitable for use by a computer.

In the depicted embodiment, input/output interface 705 may be configured to provide a communication interface to an input device, output device, or input and output device. UE 700 may be configured to use an output device via input/output interface 705. An output device may use the same type of interface port as an input device. For example, a USB port may be used to provide input to and output from UE 700. The output device may be a speaker, a sound card, a video card, a display, a monitor, a printer, an actuator, an emitter, a smartcard, another output device, or any combination thereof. UE 700 may be configured to use an input device via input/output interface 705 to allow a user to capture information into UE 700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 709 may be configured to provide a communication interface to RF components such as a transmitter, a receiver, and an antenna. Network connection interface 711 may be configured to provide a communication interface to network 743a. Network 743a may encompass wired and/or wireless networks such as a local-area network (LAN), a wide-area network (WAN), a computer network, a wireless network, a telecommunications network, another like network or any combination thereof. For example, network 743a may comprise a Wi-Fi network. Network connection interface 711 may be configured to include a receiver and a transmitter interface used to communicate with one or more other devices over a communication network according to one or more communication protocols, such as Ethernet, TCP/IP, SONET, ATM, or the like. Network connection interface 711 may implement receiver and transmitter functionality appropriate to the communication network links (e.g., optical, electrical, and the like). The transmitter and receiver functions may share circuit components, software or firmware, or alternatively may be implemented separately.

RAM 717 may be configured to interface via bus 702 to processing circuitry 701 to provide storage or caching of data or computer instructions during the execution of software programs such as the operating system, application programs, and device drivers. ROM 719 may be configured to provide computer instructions or data to processing circuitry 701. For example, ROM 719 may be configured to store invariant low-level system code or data for basic system functions such as basic input and output (I/O), startup, or reception of keystrokes from a keyboard that are stored in a non-volatile memory. Storage medium 721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 721 may be configured to include operating system 723, application program 725 such as a web browser application, a widget or gadget engine or another application, and data file 727. Storage medium 721 may store, for use by UE 700, any of a variety of various operating systems or combinations of operating systems.

Storage medium 721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 721 may allow UE 700 to access computer-executable instructions, application programs or the like, stored on transitory or non-transitory memory media, to off-load data, or to upload data. An article of manufacture, such as one utilizing a communication system may be tangibly embodied in storage medium 721, which may comprise a device readable medium.

In FIG. 7, processing circuitry 701 may be configured to communicate with network 743b using communication subsystem 731. Network 743a and network 743b may be the same network or networks or different network or networks. Communication subsystem 731 may be configured to include one or more transceivers used to communicate with network 743b. For example, communication subsystem 731 may be configured to include one or more transceivers used to communicate with one or more remote transceivers of another device capable of wireless communication such as another WD, UE, or base station of a radio access network (RAN) according to one or more communication protocols, such as IEEE 802.7, CDMA, WCDMA, GSM, LTE, UTRAN, WiMax, or the like. Each transceiver may include transmitter 733 and/or receiver 735 to implement transmitter or receiver functionality, respectively, appropriate to the RAN links (e.g., frequency allocations and the like). Further, transmitter 733 and receiver 735 of each transceiver may share circuit components, software or firmware, or alternatively may be implemented separately.

In the illustrated embodiment, the communication functions of communication subsystem 731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 731 may include cellular communication, Wi-Fi communication, Bluetooth communication, and GPS communication. Network 743b may encompass wired and/or wireless networks such as a local-area network (LAN), a wide-area network (WAN), a computer network, a wireless network, a telecommunications network, another like network or any combination thereof. For example, network 743b may be a cellular network, a Wi-Fi network, and/or a near-field network. Power source 713 may be configured to provide alternating current (AC) or direct current (DC) power to components of UE 700.

The features, benefits and/or functions described herein may be implemented in one of the components of UE 700 or partitioned across multiple components of UE 700. Further, the features, benefits, and/or functions described herein may be implemented in any combination of hardware, software or firmware. In one example, communication subsystem 731 may be configured to include any of the components described herein. Further, processing circuitry 701 may be configured to communicate with any of such components over bus 702. In another example, any of such components may be represented by program instructions stored in memory that when executed by processing circuitry 701 perform the corresponding functions described herein. In another example, the functionality of any of such components may be partitioned between processing circuitry 701 and communication subsystem 731. In another example, the non-computationally intensive functions of any of such components may be implemented in software or firmware and the computationally intensive functions may be implemented in hardware.

Figure 8:
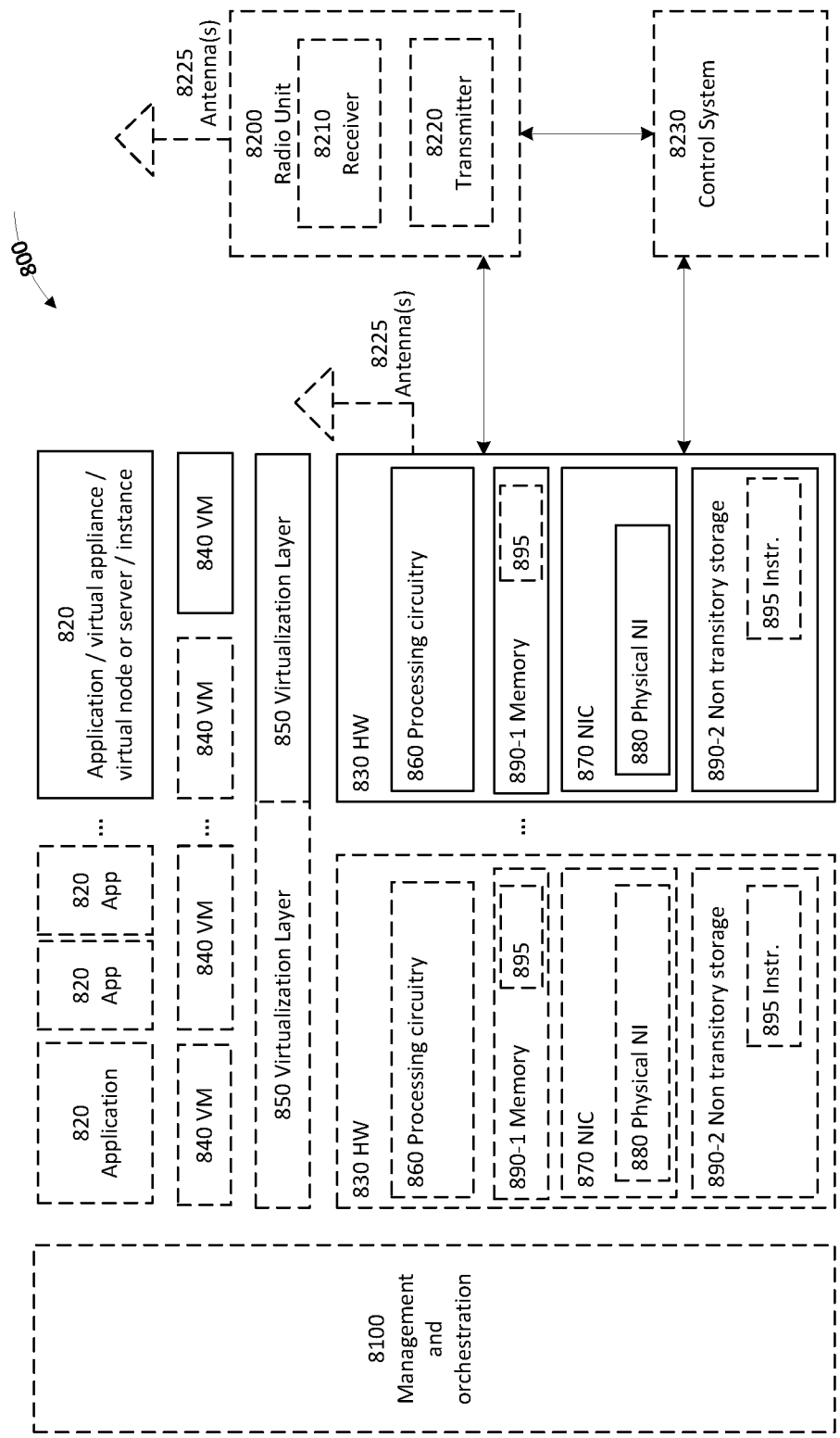
FIG. 8 is a block diagram of a virtualization environment in accordance with some embodiments.

FIG. 8 is a schematic block diagram illustrating a virtualization environment 800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 800 hosted by one or more of hardware nodes 830. Further, in embodiments in which the virtual node is not a radio access node or does not require radio connectivity (e.g., a core network node), then the network node may be entirely virtualized.

The functions may be implemented by one or more applications 820 (which may alternatively be called software instances, virtual appliances, network functions, virtual nodes, virtual network functions, etc.) operative to implement some of the features, functions, and/or benefits of some of the embodiments disclosed herein. Applications 820 are run in virtualization environment 800 which provides hardware 830 comprising processing circuitry 860 and memory 890. Memory 890 contains instructions 895 executable by processing circuitry 860 whereby application 820 is operative to provide one or more of the features, benefits, and/or functions disclosed herein.

Virtualization environment 800, comprises general-purpose or special-purpose network hardware devices 830 comprising a set of one or more processors or processing circuitry 860, which may be commercial off-the-shelf (COTS) processors, dedicated Application Specific Integrated Circuits (ASICs), or any other type of processing circuitry including digital or analog hardware components or special purpose processors. Each hardware device may comprise memory 890-1 which may be non-persistent memory for temporarily storing instructions 895 or software executed by processing circuitry 860. Each hardware device may comprise one or more network interface controllers (NICs) 870, also known as network interface cards, which include physical network interface 880. Each hardware device may also include non-transitory, persistent, machine-readable storage media 890-2 having stored therein software 895 and/or instructions executable by processing circuitry 860. Software 895 may include any type of software including software for instantiating one or more virtualization layers 850 (also referred to as hypervisors), software to execute virtual machines 840 as well as software allowing it to execute functions, features and/or benefits described in relation with some embodiments described herein.

Virtual machines 840, comprise virtual processing, virtual memory, virtual networking or interface and virtual storage, and may be run by a corresponding virtualization layer 850 or hypervisor. Different embodiments of the instance of virtual appliance 820 may be implemented on one or more of virtual machines 840, and the implementations may be made in different ways.

During operation, processing circuitry 860 executes software 895 to instantiate the hypervisor or virtualization layer 850, which may sometimes be referred to as a virtual machine monitor (VMM). Virtualization layer 850 may present a virtual operating platform that appears like networking hardware to virtual machine 840.

As shown in FIG. 8, hardware 830 may be a standalone network node with generic or specific components. Hardware 830 may comprise antenna 8225 and may implement some functions via virtualization. Alternatively, hardware 830 may be part of a larger cluster of hardware (e.g. such as in a data center or customer premise equipment (CPE)) where many hardware nodes work together and are managed via management and orchestration (MANO) 8100, which, among others, oversees lifecycle management of applications 820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 840 may be a software implementation of a physical machine that runs programs as if they were executing on a physical, non-virtualized machine. Each of virtual machines 840, and that part of hardware 830 that executes that virtual machine, be it hardware dedicated to that virtual machine and/or hardware shared by that virtual machine with others of the virtual machines 840, forms a separate virtual network elements (VNE).

Still in the context of NFV, Virtual Network Function (VNF) is responsible for handling specific network functions that run in one or more virtual machines 840 on top of hardware networking infrastructure 830 and corresponds to application 820 in FIG. 8.

In some embodiments, one or more radio units 8200 that each include one or more transmitters 8220 and one or more receivers 8210 may be coupled to one or more antennas 8225. Radio units 8200 may communicate directly with hardware nodes 830 via one or more appropriate network interfaces and may be used in combination with the virtual components to provide a virtual node with radio capabilities, such as a radio access node or a base station.

In some embodiments, some signalling can be effected with the use of control system 8230 which may alternatively be used for communication between the hardware nodes 830 and radio units 8200.

Figure 9:
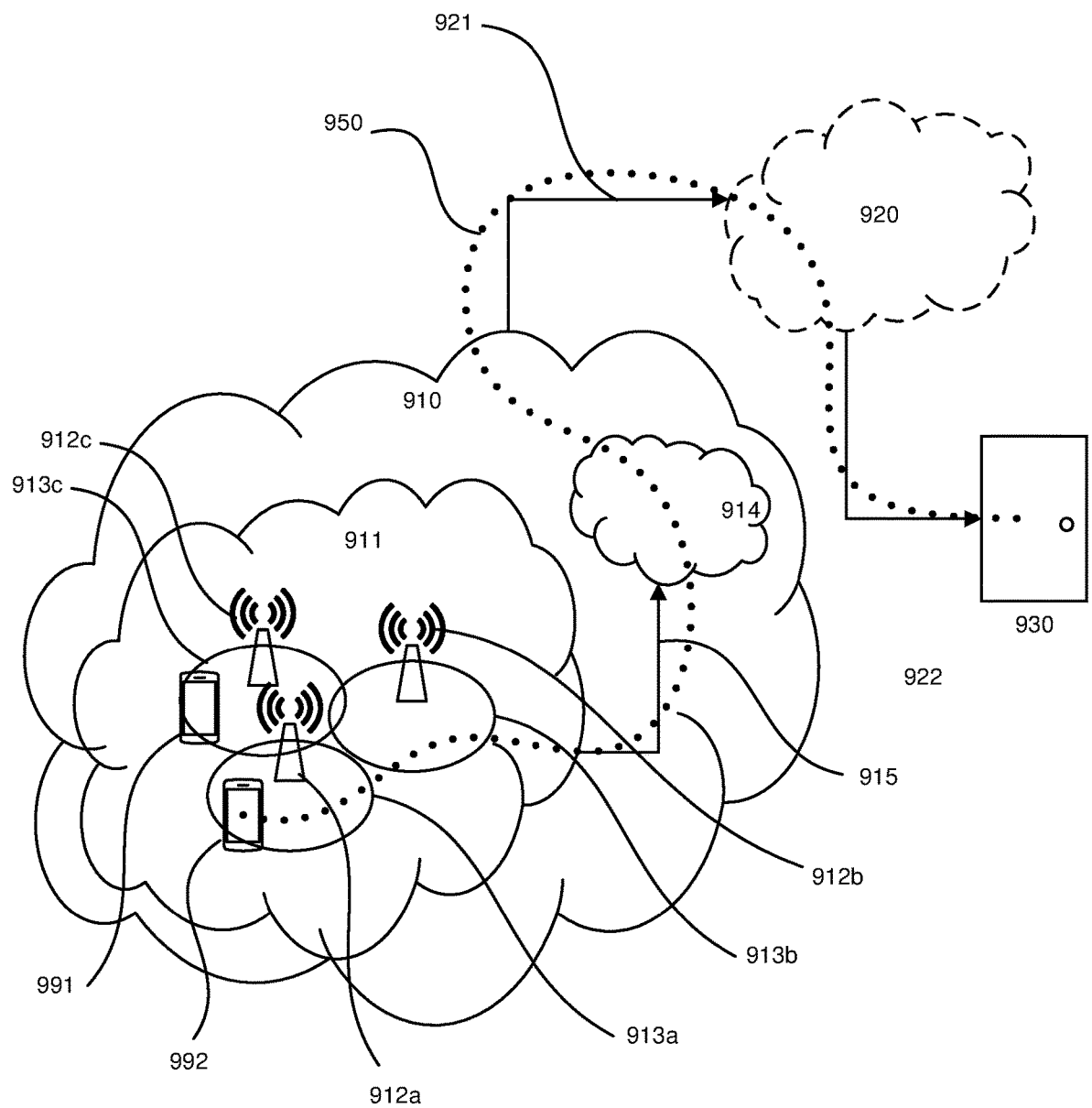
FIG. 9 is a block diagram of a telecommunication network connected via an intermediate network to a host computer in accordance with some embodiments.

With reference to FIG. 9, in accordance with an embodiment, a communication system includes telecommunication network 910, such as a 3GPP-type cellular network, which comprises access network 911, such as a radio access network, and core network 914. Access network 911 comprises a plurality of base stations 912a, 912b, 912c, such as NB s, eNBs, gNBs or other types of wireless access points, each defining a corresponding coverage area 913a, 913b, 913c. Each base station 912a, 912b, 912c is connectable to core network 914 over a wired or wireless connection 915. A first UE 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

Telecommunication network 910 is itself connected to host computer 930, which may be embodied in the hardware and/or software of a standalone server, a cloud-implemented server, a distributed server or as processing resources in a server farm. Host computer 930 may be under the ownership or control of a service provider, or may be operated by the service provider or on behalf of the service provider. Connections 921 and 922 between telecommunication network 910 and host computer 930 may extend directly from core network 914 to host computer 930 or may go via an optional intermediate network 920. Intermediate network 920 may be one of, or a combination of more than one of, a public, private or hosted network; intermediate network 920, if any, may be a backbone network or the Internet; in particular, intermediate network 920 may comprise two or more sub-networks (not shown).

The communication system of FIG. 9 as a whole enables connectivity between the connected UEs 991, 992 and host computer 930. The connectivity may be described as an over-the-top (OTT) connection 950. Host computer 930 and the connected UEs 991, 992 are configured to communicate data and/or signaling via OTT connection 950, using access network 911, core network 914, any intermediate network 920 and possible further infrastructure (not shown) as intermediaries. OTT connection 950 may be transparent in the sense that the participating communication devices through which OTT connection 950 passes are unaware of routing of uplink and downlink communications. For example, base station 912 may not or need not be informed about the past routing of an incoming downlink communication with data originating from host computer 930 to be forwarded (e.g., handed over) to a connected UE 991. Similarly, base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10. In communication system 1000, host computer 1010 comprises hardware 1015 including communication interface 1016 configured to set up and maintain a wired or wireless connection with an interface of a different communication device of communication system 1000. Host computer 1010 further comprises processing circuitry 1018, which may have storage and/or processing capabilities. In particular, processing circuitry 1018 may comprise one or more programmable processors, application-specific integrated circuits, field programmable gate arrays or combinations of these (not shown) adapted to execute instructions. Host computer 1010 further comprises software 1011, which is stored in or accessible by host computer 1010 and executable by processing circuitry 1018. Software 1011 includes host application 1012. Host application 1012 may be operable to provide a service to a remote user, such as UE 1030 connecting via OTT connection 1050 terminating at UE 1030 and host computer 1010. In providing the service to the remote user, host application 1012 may provide user data which is transmitted using OTT connection 1050.

Communication system 1000 further includes base station 1020 provided in a telecommunication system and comprising hardware 1025 enabling it to communicate with host computer 1010 and with UE 1030. Hardware 1025 may include communication interface 1026 for setting up and maintaining a wired or wireless connection with an interface of a different communication device of communication system 1000, as well as radio interface 1027 for setting up and maintaining at least wireless connection 1070 with UE 1030 located in a coverage area (not shown in FIG. 10) served by base station 1020. Communication interface 1026 may be configured to facilitate connection 1060 to host computer 1010. Connection 1060 may be direct or it may pass through a core network (not shown in FIG. 10) of the telecommunication system and/or through one or more intermediate networks outside the telecommunication system. In the embodiment shown, hardware 1025 of base station 1020 further includes processing circuitry 1028, which may comprise one or more programmable processors, application-specific integrated circuits, field programmable gate arrays or combinations of these (not shown) adapted to execute instructions. Base station 1020 further has software 1021 stored internally or accessible via an external connection.

Communication system 1000 further includes UE 1030 already referred to. Its hardware 1035 may include radio interface 1037 configured to set up and maintain wireless connection 1070 with a base station serving a coverage area in which UE 1030 is currently located. Hardware 1035 of UE 1030 further includes processing circuitry 1038, which may comprise one or more programmable processors, application-specific integrated circuits, field programmable gate arrays or combinations of these (not shown) adapted to execute instructions. UE 1030 further comprises software 1031, which is stored in or accessible by UE 1030 and executable by processing circuitry 1038. Software 1031 includes client application 1032. Client application 1032 may be operable to provide a service to a human or non-human user via UE 1030, with the support of host computer 1010. In host computer 1010, an executing host application 1012 may communicate with the executing client application 1032 via OTT connection 1050 terminating at UE 1030 and host computer 1010. In providing the service to the user, client application 1032 may receive request data from host application 1012 and provide user data in response to the request data. OTT connection 1050 may transfer both the request data and the user data. Client application 1032 may interact with the user to generate the user data that it provides.

Figure 10:
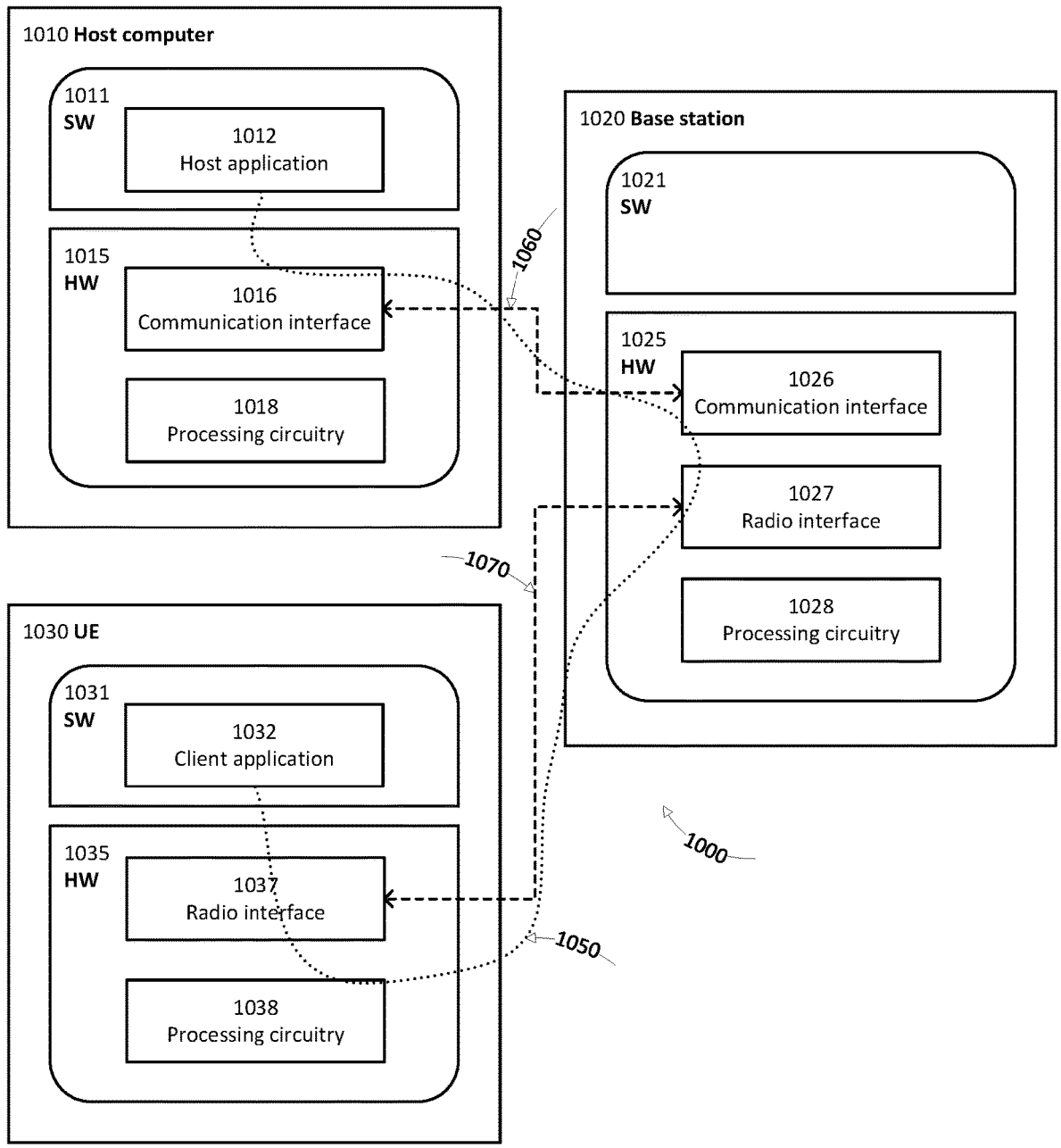
FIG. 10 is a block diagram of a host computer communicating via a base station with a user equipment over a partially wireless connection in accordance with some embodiments.

It is noted that host computer 1010, base station 1020 and UE 1030 illustrated in FIG. 10 may be similar or identical to host computer 930, one of base stations 912a, 912b, 912c and one of UEs 991, 992 of FIG. 9, respectively. This is to say, the inner workings of these entities may be as shown in FIG. 10 and independently, the surrounding network topology may be that of FIG. 9.

In FIG. 10, OTT connection 1050 has been drawn abstractly to illustrate the communication between host computer 1010 and UE 1030 via base station 1020, without explicit reference to any intermediary devices and the precise routing of messages via these devices. Network infrastructure may determine the routing, which it may be configured to hide from UE 1030 or from the service provider operating host computer 1010, or both. While OTT connection 1050 is active, the network infrastructure may further take decisions by which it dynamically changes the routing (e.g., on the basis of load balancing consideration or reconfiguration of the network).

Wireless connection 1070 between UE 1030 and base station 1020 is in accordance with the teachings of the embodiments described throughout this disclosure. One or more of the various embodiments may improve the performance of OTT services provided to UE 1030 using OTT connection 1050, in which wireless connection 1070 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection 1050 between host computer 1010 and UE 1030, in response to variations in the measurement results. The measurement procedure and/or the network functionality for reconfiguring OTT connection 1050 may be implemented in software 1011 and hardware 1015 of host computer 1010 or in software 1031 and hardware 1035 of UE 1030, or both. In embodiments, sensors (not shown) may be deployed in or in association with communication devices through which OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of OTT connection 1050 may include message format, retransmission settings, preferred routing etc.; the reconfiguring need not affect base station 1020, and it may be unknown or imperceptible to base station 1020. Such procedures and functionalities may be known and practiced in the art. In certain embodiments, measurements may involve proprietary UE signaling facilitating host computer 1010's measurements of throughput, propagation times, latency and the like. The measurements may be implemented in that software 1011 and 1031 causes messages to be transmitted, in particular empty or 'dummy' messages, using OTT connection 1050 while it monitors propagation times, errors etc.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Explanations are provided below for abbreviations that are mentioned in the present disclosure.

| Abbreviation | Explanation |
| --- | --- |
| 3GPP | Third Generation Partnership Project |
| 5GC | 5G Core Network |
| 5GS | 5G System |
| AMF | Access and Mobility Management Function |
| CA | Carrier Aggregation |
| CP | Cyclic Prefix |
| DC | Dual Connectivity |
| DL | Downlink |
| DRB | Data Radio Bearer |
| DRX | Discontinuous Reception |
| DTX | Discontinuous Transmission |
| eLTE | enhanced LTE |
| eNB | E-UTRAN NodeB |

-continued

| Abbreviation | Explanation |
| --- | --- |
| EN-DC | E-UTRA-NR Dual Connectivity |
| E-UTRA | Evolved Universal Mobile Terrestrial Radio Access |
| E-UTRAN | Evolved Universal Mobile Terrestrial Radio Access Network |
| EPC | Evolved Packet Core |
| EPS | Evolved Packet System |
| FDD | Frequency Division Duplexing |
| FDMA | Frequency Division Multiple Access |
| gNB | NR gNodeB |
| HO | Handover |
| IE | Information Element |
| LTE | Long Term Evolution |
| LTE-DC | LTE Dual Connectivity |
| MAC-I | Message Authentication Code - Integrity |
| MCG | Master Cell Group |
| MeNB | Master eNB |
| MME | Mobility Management Entity |
| MN | Master Node |
| MPR | Maximum Power Reduction |
| MR | Multi-RAT |
| MR-DC | Multi-RAT Dual Connectivity |
| NE-DC | NR-E-UTRA Dual Connectivity |
| NG | Next Generation |
| NGEN-DC | NG-RAN E-UTRA-NR Dual Connectivity |
| NR | New Radio |
| NR-NR-DC | New Radio - New Radio Dual Connectivity |
| NSA | Non-standalone |
| OFDM | Orthogonal Frequency Division Multiplexing |
| PDCP | Packet Data Convergence Protocol |
| P-GW | Packet Gateway |
| PRACH | Physical Random Access Channel |
| PUCCH | Physical Uplink Control Channel |
| PUSCH | Physical Uplink Shared Channel |
| RAN | Radio Access Network |
| RAT | Radio Access Technology |
| RRC | Radio Resource Control |
| SA | Standalone |
| SAR | Specific Absorption Rate |
| SC-FDMA | Single Carrier FDMA |
| SCG | Secondary Cell Group |
| SCS | Subcarrier spacing |
| SMF | Session Management Function |
| SFI | Slot Frame Indicator |
| S-GW | Serving GateWay |
| S-MN | Source MN |
| SN | Secondary Node |
| SRB | Signalling Radio Bearer |
| SRS | Sounding Reference Signal |
| S-SN | Source SN |
| TDD | Time Division Duplexing |
| T-MN | Target MN |
| TS | Technical Specification |
| UE | User Equipment |
| UL | Uplink |
| UPF | User Plane Function |

What is claimed is:

1. A method of operating a user equipment (UE) that is served by a radio access network (RAN), the method comprising:
   determining an uplink duty cycle for uplink transmission by the UE to the RAN; and
   selecting a peak uplink power level in response to the determined uplink duty cycle;
   wherein:
      the duty cycle is modified due to:
         device heat management;
         discontinuous transmission (DTX);
         discontinuous reception (DRX);
         measurement gaps;
         specific absorption rate; and/or
         proximity detection, determining the uplink duty cycle comprises determining the uplink duty cycle based on a slot format indicator (SFI) provided by a network node in the RAN; and the UE selects the peak uplink power for user during a time period such that an average uplink power during the time period is less than a predetermined power level.

2. The method of claim 1, wherein determining the uplink duty cycle comprises determining the uplink duty cycle based on a common time division duplexing (TDD) uplink/downlink pattern provided by a network node in the RAN.

3. The method of claim 1, wherein determining the uplink duty cycle comprises determining the uplink duty cycle based on a dedicated uplink/downlink pattern provided by a network node in the RAN.

4. The method of claim 1, wherein the uplink duty cycle represents a fraction of time in a time period during which the UE is scheduled to transmit uplink signals to the RAN.

5. The method of claim 4, wherein the time period is a frame.

6. The method of claim 4, wherein the uplink duty cycle is determined on a timeslot by timeslot basis.

7. The method of claim 1, wherein the uplink duty cycle represents a fraction of time in a time period that is reserved for transmission of uplink signals to the RAN.

8. The method of claim 1, wherein the uplink duty cycle represents a fraction of time in a time period that is reserved for transmission of uplink signals to the RAN or that is reserved for flexible time slots.

9. The method of claim 1, wherein the uplink duty cycle is determined on a symbol by symbol basis.

10. The method of claim 1, wherein the uplink duty cycle is determined based on a number of slots or symbols reserved for downlink communications in a given time period.

11. The method of claim 1, wherein the UE is connected to the RAN via carrier aggregation, and wherein the uplink duty cycle is determined across a plurality of component carriers.

12. The method of claim 11, wherein the uplink duty cycle is determined based on a number of time intervals that are reserved for uplink transmission on any of the plurality of component carriers.

13. The method of claim 11, wherein the uplink duty cycle is determined based on a number of time intervals that are reserved for uplink transmission or that are available for uplink or downlink communications on any of the plurality of component carriers.

14. The method of claim 11, wherein the UE is connected to a first cell group served by a new radio (NR) network node and to a second cell group served by a long term evolution (LTE) node via dual connectivity, and wherein the duty cycle is determined based on an uplink/downlink configuration provided for the second cell group and based on a common time division duplexing (TDD) uplink/downlink pattern, dedicated uplink/downlink pattern and/or slot frame indicator (SFI) provided for the first cell group.

15. The method of claim 11, wherein the duty cycle is determined as a N/P, where N is a number of time intervals in a given time period in which the UE is scheduled to transmit uplink communications and P is a total number of time intervals in the time period.

16. The method of claim 1, wherein the predetermined power level is 23 dBm.

17. The method of claim 1, wherein the duty cycle is modified due to any type of maximum power reduction (MPR) that is associated with an operating band of the UE.

18. The method of claim 1, wherein the duty cycle on a frequency range FR1 of 410 MHz to 7125 MHz is modified due to the uplink transmissions on a frequency range FR2 of 24250 MHz to 52600 MHz or a duty cycle of FR2 transmissions.

19. A method of operating a user equipment (UE) that communicates with a radio access network (RAN) via a plurality of component carriers, the method comprising:

determining an aggregate uplink duty cycle based on scheduled uplink time intervals across the plurality of component carriers; and selecting a peak uplink transmission power level for transmitting uplink signals on the plurality of component carriers in response to the determined aggregate uplink duty cycle; wherein:

the duty cycle is modified due to:
  device heat management;
  discontinuous transmission (DTX);
  discontinuous reception (DRX);
  measurement gaps;
  specific absorption rate; and/or
  proximity detection;

determining the uplink duty cycle comprises determining the uplink duty cycle based on a slot format indicator (SFI) provided by a network node in the RAN; and selecting the peak uplink power for user during a time period such that an average uplink power during the time period is less than a predetermined power level.

20. The method of claim 19, further comprising transmitting uplink communications using the selected peak uplink transmission power level.

21. The method of claim 19, wherein the duty cycle is modified for carrier aggregation due to UE capability to transmit and receive simultaneously.

22. A user equipment (UE) node, comprising:
a processor;
a wireless transceiver coupled to the processor; and
a memory coupled to the processor, wherein the memory comprises computer readable instructions that, when executed by the processor, cause the UE to perform operations comprising:
  determining an uplink duty cycle for uplink transmission by the UE to a radio access network (RAN); and
  selecting a peak uplink power level in response to the determined uplink duty cycle;
wherein:
  the duty cycle is modified due to:
    device heat management;
    discontinuous transmission (DTX);
    discontinuous reception (DRX);
    measurement gaps;
    specific absorption rate; and/or
    proximity detection;
  determining the uplink duty cycle comprises determining the uplink duty cycle based on a slot format indicator (SFI) provided by a network node in the RAN; and
  selecting the peak uplink power for user during a time period such that an average uplink power during the time period is less than a predetermined power level.

* * * * *